(12) United States Patent
van den Esschert et al.

(10) Patent No.: US 9,321,864 B2
(45) Date of Patent: Apr. 26, 2016

(54) CATALYST COMPOSITION AND METHOD FOR PREPARING THE SAME

(71) Applicant: SAUDI BASIC INDUSTRIES CORPORATION, Riyadh (SA)

(72) Inventors: Bart Albertus Hubertus van den Esschert, Sittard (NL); Maria Johanna Willems, Geleen (NL); Abdulaziz Hamad Al-Humydi, Riyadh (SA); Yahya Banat, Riyadh (SA); Atieh Aburaqabah, Riyadh (SA); Said Fellahi, Riyadh (SA)

(73) Assignee: SAUDI BASIC INDUSTRIES CORPORATION, Riyadh (SA)

( * ) Notice: Subject to any disclaimer, the term of this patent is extended or adjusted under 35 U.S.C. 154(b) by 0 days.

(21) Appl. No.: 14/368,431

(22) PCT Filed: Dec. 20, 2012

(86) PCT No.: PCT/EP2012/005298
§ 371 (c)(1),
(2) Date: Jun. 24, 2014

(87) PCT Pub. No.: WO2013/097936
PCT Pub. Date: Jul. 4, 2013

(65) Prior Publication Data
US 2015/0031824 A1 Jan. 29, 2015

(30) Foreign Application Priority Data
Dec. 28, 2011 (EP) .................................... 11010262

(51) Int. Cl.
| | | |
|---|---|---|
| C08F 4/64 | (2006.01) | |
| C08F 2/00 | (2006.01) | |
| C08F 210/16 | (2006.01) | |
| C08F 110/02 | (2006.01) | |
| C08L 23/06 | (2006.01) | |
| C08J 5/22 | (2006.01) | |
| C08F 10/00 | (2006.01) | |

(52) U.S. Cl.
CPC ............... *C08F 210/16* (2013.01); *C08F 10/00* (2013.01); *C08F 110/02* (2013.01); *C08J 5/2231* (2013.01); *C08L 23/06* (2013.01); *C08F 2/002* (2013.01); *C08F 2410/02* (2013.01); *C08J 2335/04* (2013.01)

(58) Field of Classification Search
CPC .... C08F 2410/02; C08F 2410/03; C08F 4/52; C08F 4/64; C08F 2/002
See application file for complete search history.

(56) References Cited

U.S. PATENT DOCUMENTS

| | | | |
|---|---|---|---|
| 4,012,574 A | 3/1977 | Jones et al. | |
| 4,543,399 A | 9/1985 | Jenkins, III et al. | |
| 4,798,081 A | 1/1989 | Hazlitt et al. | |
| 5,026,795 A | 6/1991 | Hogan | |
| 5,066,736 A | 11/1991 | Dumain et al. | |
| 5,332,706 A | 7/1994 | Nowlin et al. | |
| 5,405,922 A | 4/1995 | DeChellis et al. | |
| 5,427,991 A | 6/1995 | Turner | |
| 5,461,123 A | 10/1995 | Song et al. | |
| 5,462,999 A | 10/1995 | Griffin et al. | |
| 5,473,028 A | 12/1995 | Nowlin et al. | |
| 5,492,975 A | 2/1996 | Peifer et al. | |
| 5,604,171 A * | 2/1997 | Collette ................. | C08F 10/00 502/103 |
| 5,610,244 A | 3/1997 | Govoni et al. | |
| 5,627,243 A | 5/1997 | Hamalainen et al. | |
| 5,643,847 A | 7/1997 | Walzer, Jr. | |
| 5,661,095 A | 8/1997 | Meverden et al. | |
| 5,972,444 A | 10/1999 | Patel et al. | |
| 6,114,479 A * | 9/2000 | Speca ..................... | G08F 10/00 502/152 |
| 6,117,955 A * | 9/2000 | Agapiou ................. | C08F 10/00 502/132 |
| 6,998,449 B2 * | 2/2006 | Kimberley ...................... | 526/82 |
| 7,919,569 B2 * | 4/2011 | Xu et al. ........................ | 526/163 |
| 8,569,194 B2 * | 10/2013 | Xu .......................... | C08F 10/00 502/113 |
| 8,957,167 B2 * | 2/2015 | Hussein .................. | C08F 10/00 502/103 |
| 2010/0298508 A1 | 11/2010 | Michie et al. | |
| 2015/0011702 A1 | 1/2015 | Van Den Esschert et al. | |

FOREIGN PATENT DOCUMENTS

| | | | |
|---|---|---|---|
| EP | 0453116 B1 | 10/1991 | |
| EP | 0549252 A1 | 6/1993 | |
| EP | 811 638 A2 * | 12/1997 | ............... C08F 2/44 |
| EP | 0811638 A2 | 12/1997 | |
| EP | 1059299 A1 | 12/2000 | |

(Continued)

OTHER PUBLICATIONS

Eisch; "Aluminum"; Comprehensive Organometallic Chemistry; vol. 1, Chapter 6; 1982; 128 Pages.
Extended European Search Report; European Application No. 11010262.1; Date of Mailing: Jun. 19, 2012; 5 Pages.
International Search Report; International Application No. PCT/EP2012/005298; International Filing Date: Dec. 12, 2012; Date of Mailing: Apr. 25, 2013; 5 Pages.

(Continued)

*Primary Examiner* — Rip A Lee
(74) *Attorney, Agent, or Firm* — Cantor Colburn LLP

(57) ABSTRACT

The present invention relates to a catalyst composition for the polymerisation of olefins comprising a support containing a single site catalyst component, a catalyst activator and a modifier wherein the modifier is the product of reacting an aluminum compound of general formula Al(R1, R2, R3) with an amine compound of general formula N(R4, R5, R6). The catalyst composition reduces fouling and/or sheeting when used to catalyse the polymerisation of olefins. The present invention also relates to a method for the polymerisation of olefins using the catalyst composition of the invention.

18 Claims, 12 Drawing Sheets

(56) References Cited

FOREIGN PATENT DOCUMENTS

| | | |
|---|---|---|
| EP | 0668865 B1 | 7/2003 |
| EP | 1731535 A1 | 12/2006 |
| WO | 9608520 A1 | 3/1996 |
| WO | 9611960 A1 | 4/1996 |
| WO | 9611961 A1 | 4/1996 |
| WO | 9615161 A1 | 5/1996 |
| WO | 9706186 A1 | 2/1997 |
| WO | 9714721 A1 | 4/1997 |
| WO | 9727224 A1 | 7/1997 |
| WO | 9746599 A1 | 12/1997 |
| WO | 2006130953 A1 | 12/2006 |

OTHER PUBLICATIONS

Written Opinion of the International Searching Authority; International Application No. PCT/EP2012/005298; International Filing Date: Dec. 20, 2012; Date of Mailing: Apr. 25, 2013; 6 Pages.
Peacock; "Handbook of Polyethylene: Structures, Properties, and Applications"; Chapter 3—Production Processes; 2000; 26 Pages.
Wild et al.; "Determination of Branching Distributions in Polyethylene and Ethylene Copolymers"; Journal of Polymer Science: Polymer Physics Edition; vol. 20; 1982; pp. 441-455.

* cited by examiner

CATALYST COMPOSITION AND METHOD FOR PREPARING THE SAME

CROSS REFERENCE TO RELATED APPLICATIONS

This application is a 371 of International Application No. PCT/EP2012/005298, filed Dec. 20, 2012, which claims priority to European Application No. 11010262.1, filed Dec. 28, 2011, both of which are hereby incorporated by reference in its entirety.

The present invention relates to a catalyst composition for the polymerisation of olefins comprising a support containing a single site catalyst component, a catalyst activator and a modifier. The present invention further relates to a method for preparing such a catalyst. The present invention further relates to a method for the polymerisation of olefins.

Olefin polymerisation processes utilizing single site catalyst compositions allow a diverse array of new polymers to be produced which are useful in a wide variety of applications and products. Single-site catalysts include metallocene catalysts and non-metallocene catalysts. Metallocene catalysts generally are complexes with one or two cyclopentadienyl groups or cyclopentadienyl derivatives which are bonded to a transition metal atom, for example a transition metal selected from the group consisting of lanthanides and metals from group 3, 4, 5 or 6 of the Periodic System of Elements. Similar functioning structures such as phospholes may be used as well. Single-site catalysts may also have other stabilizing ligands such as cyclooctatetradienyl, imides, phenoxy imines, amines and the like. Examples of typical single-site catalysts include but are not limited to bridged or unbridged metallocenes, mono-cyclopentadienyl containing complexes, late transition metal containing complexes and metal complexes with one or more of phosphinimine cyclooctatetraendiyl, imides, phenoxy imines, amines stabilizing ligands.

The skilled person is well aware of all the several types of single site catalysts.

A problem associated with the use of supported single site catalyst systems, in particular based on metallocene catalyst components, is their tendency to cause fouling and/or sheeting in gas phase and slurry polymerisation processes. Fouling on the walls of the reactor and/or reactor components results in many serious problems including poor heat transfer, particle morphology, and undesirable reactor shut-down. Also, fines may be formed.

With fouling as used herein is meant the sticking or formation of material, for example in the form of particles, on the inside wall and/or other components on the inside of the reactor. While not wishing to be bound by it, the present inventors believe that reactor wall fouling, which occurs during polymerisation, is due to several factors. First, residual solvent may remain in the pores of the catalyst support material employed at the stage after placement of the catalyst onto the carrier. The residual solvent prevents the catalyst system from securely anchoring itself onto the carrier or into the pores of the carrier. Thus when the supported catalyst is added to the reaction polymerisation vessel, the catalyst disassociates from the support, and migrates to the reactor walls where monomer can polymerize therefrom and cause fouling. Secondly, when alumoxane, such as methyl alumoxane (MAO) is used as cocatalyst in the polymerisation at temperatures about or greater than 40° C., the alumoxane may dissolve and extract the metallocene catalyst from the support forming a soluble catalyst in the polymerisation medium. This soluble catalyst easily deposits polymer onto the reactor walls and/or generates very small particles of low bulk density which are undesirable in a commercial reactor. Reactor fouling due to the use of alumoxane is of particular importance for catalyst compositions based on metallocene catalyst components which require relatively high amounts of catalyst activator for their activation.

With sheeting as used herein is meant the formation of a sheet, e.g. a thin layer, of polymer material on the inside wall and/or other components on the inside of the reactor.

Various methods for reducing fouling and/or sheeting of a single-site catalyst system have been disclosed in the art. U.S. Pat. No. 5,283,218 discloses the prepolymerisation of a metallocene catalyst. U.S. Pat. No. 5,332,706 and U.S. Pat. No. 5,473,028 report to form a catalyst by "incipient impregnation". U.S. Pat. Nos. 5,427,991 and 5,643,847 disclose the use of tethered non-coordinating anionic activators into supports. U.S. Pat. No. 5,492,975 discloses polymer bound metallocene catalyst systems. U.S. Pat. No. 5,661,095 supported a metallocene catalyst on a copolymer of an olefin and an unsaturated silane. WO 97/06186 discloses a technique to remove impurities after formation of the metallocene catalyst. WO 97/27224 relates to support catalysts in the presence of an unsaturated organic compound having at least one terminal double bond. WO 97/14721 discloses to introduce an inert hydrocarbon to the reactor in order to reduce fines that can cause sheeting.

U.S. Pat. No. 5,627,243 uses a new type of distributor plate for fluidized bed gas phase reactors. WO 96/08520 discusses eliminating a scavenger into the reactor. U.S. Pat. No. 5,461,123 discloses to apply sound waves in order to reduce sheeting. U.S. Pat. No. 5,066,736 and EP 10549252 disclose to introduce an activity retarder to reduce agglomerates. U.S. Pat. No. 5,610,244 feeds make-up monomer directly into the reactor to avoid fouling. EP 0453116 discloses the introduction of antistatic agents to the reactor for reducing the amount of sheets and agglomerates. U.S. Pat. No. 4,012,574 teaches adding a surface-active compound, such as a perfluorocarbon group to the reactor to reduce fouling. WO 96/11961 discloses a supported catalyst system having an antistatic component for reducing fouling and sheeting in several polymerisation processes. U.S. Pat. No. 5,026,795 teaches the addition of an antistatic agent with a liquid carrier to the polymerisation zone in the reactor. WO 97/46599 discloses to utilize soluble metallocene catalysts that are fed into a lean zone in a polymerisation reactor with antifoulants or antistatic agents such as ATMER 163 (available from ICI Specialty Chemicals, Baltimore, Md.). EP 811638 discusses using a metallocene catalyst and an activating cocatalyst in a polymerisation process in the presence of nitrogen containing antistatic agent.

There are various other known methods for improving operability including coating the polymerisation equipment, injecting various agents into the reactor, controlling the polymerisation rate, particularly on start-up, and reconfiguring the reactor design.

WO 96/11960 discloses a catalyst system prepared by combining in a suitable solvent a support material, a metallocene catalyst component, an activator and a surface modifier. WO 96/11960 defines the surface modifier as any organic compound containing at least one electron rich heteroatom from Groups IV, V and/or VI in addition to a hydrocarbyl moiety. Typical of such heteroatoms are silicon, oxygen, nitrogen, phosphorus, and sulfur. The surface modifier may also contain at least one active hydrogen atom attached to the heteroatom. The hydrocarbyl moiety should have a molecular weight sufficient to give it solubility in typical hydrocarbon solvents such as cyclic aliphatic or aromatic hydrocarbons. The surface modifier can be represented by the formula, $R_mXH_n$ where R may be a branched or straight chain hydrocarbyl group or substituted hydrocarbyl group or groups having one or more carbon atoms and where X is at least one heteroatom, which can be O, N, P or S atoms or a combination thereof and H is an active hydrogen and n is such that the compound has no net charge. As an example of the surface modifier WO96/11960 discloses Kemamine AS-990 and Atmer 163, both being alkoxylated tertiary amines. The catalyst compositions of WO 95/11960 reduce fouling and sheeting in a gas phase or slurry polymerisation process, in addition to that the catalyst composition has better flow properties which facilitate its delivery into the reactor and. Finally this catalyst composition results in a high bulk density polymer product having improved physical properties.

WO 2006/130953 is directed to the problem of fouling and/or sheeting during the polymerisation of olefins. This patent application discloses that aluminum alkyls are often used as scavengers for olefin polymerisation, but that an excess amount of scavenger will deactivate the single-site catalyst. In addition to that antistatic agents such as amines or hydroxylated amines (which are well known antistatic agents) may deactivate single site catalysts by blocking the active catalytic centres. WO2006/130953 discloses a process for olefin polymerisation which prevents reactor fouling and/or sheeting and simultaneously provides a sufficient productivity of the catalytic system used. The process of WO2006/130953 comprises the steps of (i) introducing at least one olefin, at least one polymerisation catalyst, and at least one cocatalyst aid, and optionally a scavenger, into a polymerisation reactor, and (ii) polymerizing the olefin, wherein the cocatalyst aid is a reaction product prepared separately prior to the introduction into the reactor by reacting at least one metal alkyl compound of group IIA or IIIA of the periodic system of elements and at least one compound (A) of the formula $R_mXR'_n$ wherein R is a branched, straight, or cyclic, substituted or unsubstituted, hydrocarbon group having 1 to 50 carbon atoms, R' is hydrogen or any functional group with at least one active hydrogen, X is at least one heteroatom selected from the group of O, N, P or S or a combination thereof, and wherein n and m are each at least 1 and are such that the formula has no net charge wherein the ratio of the metal of the metal alkyl compound and X of compound (A) is about 1:2 to about 10:1. As an example of the cocatalyst aid WO 2006/130953 discloses the reaction product of the reaction between aluminumalkyls such as triisobutylaluminum and antistatic agents such as $C_{18}H_{37}NH_2$. According to WO 2006/130953 it is essential that the co catalyst aid is prepared separately prior to being introduced into the polymerisation reaction. The mere addition of an antistatic agent (such as $C_{18}H_{37}NH_2$) and a scavenger (such as aluminumalkyls) separately into the polymerisation reactor should be avoided. According to the invention of WO 2006/130953 the problems with regard to scavenger capability as well as antistatic capability are overcome.

Reactions between amine and aluminum alkyls as disclosed in WO 2006/130953 have been reported before. It is believed that the first step is a ligand addition between the aluminum alkyl and the amine. The alkyl elimination could occur at elevated temperature. (J. J. Eisch, page 555, Chapter 6, vol. 1, Comprehensive Organometallic Chemistry, Edited by Geoffrey Wilkinson, Gordon A. Stone and Edward W. Abel, by Pergamon Press.)

There exists a need for a further improved catalyst composition that allows a process for the polymerisation of olefins wherein fouling and/or sheeting during the process is reduced to a minimum, wherein the catalyst has high catalyst productivity, good flow properties and is relatively easy to prepare and wherein the obtained polyolefin has a high bulk density.

The present inventors have surprisingly found that such a process may be performed by employing a catalyst composition for the polymerisation of olefins comprising a support containing a single site catalyst component, a catalyst activator and a modifier wherein the modifier is the product of reacting an aluminum compound of general formula (1)

with an amine compound of general formula (2)

wherein
  R1 is hydrogen or a branched or straight, substituted or unsubstituted hydrocarbon group having 1-30 carbon atoms,
  R2 and R3 are the same or different and selected from branched or straight, substituted or unsubstituted hydrocarbon groups having 1-30 carbon atoms and
  R4 is hydrogen or a functional group with at least one active hydrogen
  R5 is hydrogen or a branched, straight or cyclic, substituted or unsubstituted hydrocarbon group having 1-30 carbon atoms,
  R6 is a branched, straight or cyclic, substituted or unsubstituted hydrocarbon group having 1-30 carbon atoms.

An important aspect of the invention is that the single site catalyst component, the catalyst activator and the modifier are contained by the support. In other words, in the catalyst composition of the invention, the single site catalyst component, the catalyst activator and the modifier are all present on the support, obviating the need for separate addition of the modifier and of the support containing the single site catalyst component and the activator.

The catalyst composition of the invention may contain from 0.01-5 wt %, preferably from 0.5-3 wt %, more preferably from 0.3-2 wt % of the modifier, based on the catalyst composition.

In a preferred embodiment of the invention the amounts of aluminum compound and amine compound are selected such that in the modifier the molar ratio of Al to N is in the range of 1:3 to 5:1, preferably 1:2 to 3:1, more preferably 1:1.5 to 1.5:1. The present inventors found that within this range a good combination of technical effects of the present invention can be obtained. If the molar ratio of Al to N is below 1:3 then fouling and/or sheeting may occur, whereas if the molar ratio of Al to N is above 5:1 catalyst productivity decreases, i.e. the amount of polymer produced per gram of catalyst decreases. The most preferred molar ratio is 1:1.

In the compound of general formula (2), R4 is a hydrogen or a functional group with at least one active hydrogen, R5 is hydrogen or a branched, straight or cyclic, substituted or unsubstituted hydrocarbon group having 1-30 carbon atoms, R6 is a branched, straight or cyclic, substituted or unsubstituted hydrocarbon group having 1-30 carbon atoms (carbon atoms of the substituents included). The branched, straight or cyclic, substituted or unsubstituted hydrocarbon group having 1-30 carbon atoms is preferably an alkyl group having 1-30 carbon atoms, for example an alkyl group having 1-30 carbon atoms, for example a straight, branched or cyclic alkyl, an aralkyl group having 1-30 carbon atoms or an alkaryl group having 1-30 carbon atoms.

The amine compound used in the reaction to prepare the modifier may be a single amine compound or a mixture of two or more different amine compounds.

The amine compound used for preparing the modifier of the present invention preferably has a hydrocarbon group of at least eight carbon atoms, more preferably at least twelve carbon atoms, for example an alkyl group of 1 to fifteen carbon atoms. The amine compound may be a primary, secondary or tertiary amine. The amine compound is preferably a primary amine.

In an embodiment of the present invention the amine compound is selected from the group consisting of octadecylamine, ethylhexylamine, cyclohexylamine, bis(4-aminocyclohexyl)methane, hexamethylenediamine, 1,3-benzenedimethanamine, 1-amino-3-aminomethyl-3,5,5-trimethylcyclohexane and 6-amino-1,3-dimethyluracil.

The aluminum compound used in the reaction to prepare the modifier may be a single aluminum compound or a mixture of two or more different aluminum compounds. R1, R2 and R3 may each independently stand for a branched or straight, substituted or unsubstituted hydrocarbon group having 1-30 carbon atoms, for example may each independently stand for an alkyl, preferably R1, R2 and R3 all stand for an alkyl, more preferably R1, R2 and R3 are the same.

The aluminum compound of the present invention is preferably a trialkylaluminum (R1=R2=R3=alkyl or a dialkylaluminumhydride (R1=hydrogen, R2=R3=alkyl).

In an embodiment of the present invention the aluminum compound is selected from the group consisting of tri-methylaluminum, tri-ethylaluminum, tri-propylaluminum, tri-butylaluminum, tri-isopropylaluminum tri-isobutylaluminum, or di-methylaluminumhydride, di-ethylaluminumhydride, di-propylaluminumhydride, di-butylaluminumhydride, di-isopropylaluminumhydride, di-isobutylaluminumhydride. These materials are readily available and have good reactivity with amines.

An alkyl as used herein will be understood by the skilled person as meaning a hydrocarbon group that contains only carbon and hydrogen atoms and is derived from alkanes such as methane, ethane, propane, butane, pentane, hexane etc. The alkyl may be branched, straight or cyclic. Preferably R1, R2 and R3 may each independently stand for a straight or branched alkyl.

In a preferred embodiment the aluminum compound is a trialkylaluminum and the amine compound is a primary amine, preferably the aluminium compound is selected from the group consisting of octadecylamine, ethylhexylamine, cyclohexylamine, bis(4-aminocyclohexyl)methane, hexamethylenediamine, 1,3-benzenedimethanamine, 1-amino-3-aminomethyl-3,5,5-trimethylcyclohexane and 6-amino-1,3-dimethyluracil.

The catalyst component of the present invention is preferably a metallocene catalyst of the general formula I below

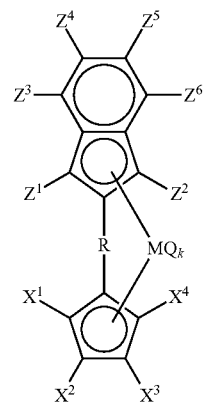

Formula I wherein:
M is a transition metal selected from the group consisting of lanthanides and metals from group 3, 4, 5 or 6 of the Periodic System of Elements; M is preferably selected from the group consisting of Ti, Zr and Hf with Zr being most preferred.
Q is an anionic ligand to M,
k represents the number of anionic ligands Q and equals the valence of M minus two divided by the valence of the anionic Q ligand
R is a hydrocarbon bridging group, such as alkyl. R preferably contains at least one sp2-hybridised carbon atom that is bonded to the indenyl group at the 2-position.
Z and X are substituents.

In another preferred embodiment the metallocene catalyst is of the general formula II below

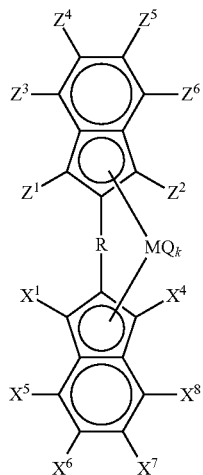

Formula II wherein:
M is a transition metal selected from the group consisting of lanthanides and metals from group 3, 4, 5 or 6 of the Periodic System of Elements; M is preferably selected from the group consisting of Ti, Zr and Hf with Zr being most preferred.
Q is an anionic ligand to M,
k represents the number of anionic ligands Q and equals the valence of M minus two divided by the valence of the anionic Q ligand R is a hydrocarbon bridging group, such as alkyl. R preferably contains at least one sp2-hybridised carbon atom that is bonded to the indenyl group at the 2-position.

Z and X are substituents.

Bridging group R in the metallocene catalysts of general formula's I and II above preferably contains at least one aryl group. For example, the aryl group may be a monoaryl group such as phenylene or naphthalene or a biaryl group, such as biphenylidene or binaphthyl. Preferably the bridging group R stands for an aryl group, preferably R stands for a phenylene or biphenylidene group. The bridging group R is connected to the indenyl groups via a sp2 hybridised carbon atom, for example a phenylene group may be connected via the 1 and the 2 position, a biphenylene group may be connected via the 2 and 2'-position, a naphthalene group may be connected via the 2 and 3-position, a binapthyl group may be connected via the 2 and 2'-position. Preferably R stands for a phenylene group that is connected to the indenyl groups via the 1 and the 2 position. R may be 2,2'-biphenylene.

The substituents X in formulas I and II above may each separately be hydrogen or a hydrocarbon group with 1-20 carbon atoms (e.g. alkyl, aryl, aryl alkyl). Examples of alkyl groups are methyl, ethyl, propyl, butyl, hexyl and decyl. Examples of aryl groups are phenyl, mesityl, tolyl and cumenyl. Examples of aryl alkyl groups are benzyl, pentamethylbenzyl, xylyl, styryl and trityl. Examples of other substituents are halides, such as chloride, bromide, fluoride and iodide, methoxy, ethoxy and phenoxy. Also, two adjacent hydrocarbon radicals may be connected with each other in a ring system. X may also be a substituent which instead of or in addition to carbon and/or hydrogen may comprise one or more heteroatoms from group 14, 15 or 16 of the Periodic System of Elements. Examples of such a heteroatom containing substituents are alkylsulphides (like MeS—, PhS—, n-butyl-S—), amines (like Me2N—, n-butyl-N—), Si or B containing groups (like Me3Si— or Et2B—) or P— containing groups (like Me2P— or Ph2P—).

Preferably the X substituents are hydrogen.

The substituents Z in formulas I and II above may each separately be a substituent as defined above for substituent X, Z1 and Z2 substituents can together with the X1 and X4 substituents form a second bridge that connects the indenyl group with the cyclopentadienyl group in the indenyl compound.

Examples of metallocene catalysts for use in the present invention are [ortho-bis(4-phenyl-2-indenyl)-benzene]zirconiumdichloride, [ortho-bis(5-phenyl-2-indenyl)-benzene]zirconiumdichloride, [ortho-bis(2-indenyl)benzene]zirconiumdichloride, [ortho-bis(2-indenyl)benzene]hafniumdichloride, [ortho-bis(1-methyl-2-indenyl)-benzene]zirconiumdichloride, [2.2'-(1.2-phenyldiyl)-1.1'-dimethylsilyl-bis(indene)]zirconiumdichloride, [2,2'-(1,2-phenyldiyl)-1,1'-diphenylsilyl-bis(indene)]zirconiumdichloride, [2,2'-(1.2-phenyldiyl)-1.1'-(1.2-ethanediyl)-bis(indene)]zirconiumdichloride, [2.2'-bis(2-indenyl)biphenyl]zirconiumdichloride and [2,2'-bis(2-indenyl)biphenyl]hafniumdichloride, The metallocene catalyst component preferably contains zirconium as metal group M. The zirconium amount in the catalyst composition is preferably in the range of 0.02-1 wt %, preferably 0.15-0.30 wt % based on the catalyst composition.

In a special embodiment, the invention relates to a catalyst composition for the polymerization of olefins comprising a support containing a metallocene catalyst, preferably biphenyl(2-indenyl)$_2$ZrCl$_2$, (methyl)aluminoxane or modified methylaluminoxane and a modifier, wherein the modifier is the product of reacting octadecylamine, 2-ethylhexylamine or cyclohexylamine with triisobutylaluminum.

Preferably, the invention relates to a catalyst composition for the polymerization of olefins comprising a support containing a single site catalyst component, preferably a metallocene catalyst, a catalyst activator, preferably an aluminoxane and a modifier wherein the modifier is the product of reacting an aluminum compound of general formula (1)

with an amine compound of general formula (2)

wherein
R1 is hydrogen or a branched or straight, substituted or unsubstituted hydrocarbon group having 1-30 carbon atoms,
R2 and R3 are the same or different and selected from branched or straight, substituted or unsubstituted hydrocarbon groups having 1-30 carbon atoms and
R4 is hydrogen or a functional group with at least one active hydrogen
R5 is hydrogen or a branched, straight or cyclic, substituted or unsubstituted hydrocarbon group having 1-30 carbon atoms,
R6 is a branched, straight or cyclic, substituted or unsubstituted hydrocarbon group having 1-30 carbon atoms, wherein the catalyst composition is prepared by a method comprising the steps of
a) preparing the modifier by reacting the aluminium compound of general formula (1)

with the amine compound of general formula (2)

wherein R1, R2, R3, R4, R5 and R6 are as defined herein
b) activating the single site catalyst component by adding the catalyst activator to said single site catalyst component to obtain an activated single site catalyst component
c) combining in a solvent a support material, the activated single site catalyst component obtained in step b) and the modifier obtained in step a) and d) optionally drying the reaction product obtained in step c)

The term "catalyst activator" as used herein is to be understood as any compound which can activate the single-site catalyst so that it is capable of polymerisation of monomers, in particular olefins. Preferably the catalyst activator is an alumoxane, a perfluorophenylborane and/or a perfluorophenylborate, preferably alumoxane, more preferably methylaluminoxane and/or modified methylaluminoxane.

The support in the catalyst composition of the present invention can be an organic or inorganic material and is preferably porous. Examples of organic material are cross-linked or functionalized polystyrene, PVC, cross-linked polyethylene. Examples of inorganic material are silica, alumina, silica-alumina, inorganic chlorides such as $MgCl_2$, talc and zeolite. Mixtures of two or more of these supports may be used. The preferred particle size of the support is from 1 to 120 micrometers, preferably of from 20 to 80 micrometers and the preferred average particle size is from 40 to 50 micrometers.

The preferred support is silica. The pore volume of the support is preferably of from 0.5 to 3 $cm^3/g$. The preferred surface area of the support material is in the range of from 50 to 500 $m^2/g$. The silica used in this invention is preferably dehydrated prior to being used to prepare the catalyst composition.

In case of a zirconium catalyst component, the amount of zirconium based on the support may for example be in the range from 0.05 to 3 wt %.

The catalyst composition according to the invention may further comprise a Ziegler-Natta and/or a chromium based catalyst component. Preferably, the invention relates to a catalyst composition comprising one catalyst component, more preferably wherein the one catalyst component is a metallocene catalyst. In a preferred embodiment of the invention, the catalyst component is diphenyl(2-indenyl)$_2$ ZrCl$_2$.

The catalyst composition preferably has an aluminum content in the range of 3-20 wt %, preferably 7-12 wt % based on the catalyst composition.

The catalyst composition of the present invention may be prepared by a method comprising the steps of
a) preparing a modifier by reacting an aluminum compound of general formula (1)

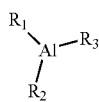
(1)

with an amine compound of general formula (2)

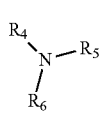
(2)

b) activating a single site catalyst component by adding a catalyst activator to said single site catalyst component, preferably in an organic solvent such as toluene or xylene to obtain an activated single site catalyst component
c) combining in a solvent a support material, the activated single site catalyst component obtained in step b) and the modifier obtained in step a)
d) optionally drying the reaction product obtained in step c)
wherein R1 is hydrogen or a branched or straight, substituted or unsubstituted hydrocarbon group having 1-30 carbon atoms,
R2 and R3 are the same or different and selected from branched or straight, substituted or unsubstituted hydrocarbon groups having 1-30 carbon atoms and
R4 is hydrogen or a functional group with at least one active hydrogen
R5 is hydrogen or a branched, straight or cyclic, substituted or unsubstituted hydrocarbon group having 1-30 carbon atoms,
R6 is a branched, straight or cyclic, substituted or unsubstituted hydrocarbon group having 1-30 carbon atoms.

In a practical embodiment step c) may be carried out by adding the activated single site catalyst, optionally including an organic solvent, to the support. The so obtained mixture may further react for at least thirty minutes, preferably at least one hour at a temperature of between 20° C. and 80° C., preferably between 40° C. and 60° C., after which the modifier obtained in step a) is added.

Step a) in the method for preparing the catalyst composition is preferably carried out a temperature of 0° C.-50° C., more preferably at a temperature of 10° C. to 35° C.

The catalyst composition obtained after drying is a dry flowing powder with particle size range of 1 to 300 microns, more preferably 5 to 90 microns.

The catalyst composition of the invention is preferably stored under an inert atmosphere, such as nitrogen or argon.

The present invention further relates to a method for the polymerisation of olefins comprising contacting olefins with the catalyst composition according to the invention under reaction conditions effective for forming a polyolefin. The polymerisation of olefins may be carried out in solution, slurry and gas-phase polymerisation process. More preferably in slurry and gas-phase process, in particular a condensed mode gas phase process.

The production processes of LDPE, HDPE and LLDPE are summarised in Handbook of Polyethylene by Andrew Peacock (2000; Dekker; ISBN 0824795466) at pages 43-66.

The catalyst composition of the present invention may be used to polymerise or copolymerise olefins, such as for example ethylene, propylene, butylene, hexene and octene. Other monomers that can be (co)polymerized include conjugated and non-conjugated dienes such as butadiene and isoprene, norbornene and styrene.

Preferably, the catalyst composition of the invention is used to produce polyethylene or an ethylene-alpha olefin copolymer, for example linear low density polyethylene.

Preferably the catalyst composition of the present invention is used for the polymerisation of ethylene to linear low density polyethylene (LLDPE). To that extent ethylene may be copolymerised with small amounts of copolymers, for example alpha-olefins having 3 to 10 carbon atoms. For example ethylene may be copolymerized with octene when polymerisation is carried out in a slurry phase and butene and/or hexene when polymerisation is carried out in the gas phase. Reaction conditions and equipment to be employed for the polymerisation are known to the skilled person.

Any conventional ethylene (co)polymerization reaction may be employed to produce polyethylene. Such conventional ethylene (co)polymerization reactions include, but are not limited to, gas phase polymerization process, slurry phase polymerization process, liquid phase polymerization process, and combinations thereof using one or more conventional reactors, e.g. fluidized bed gas phase reactors, loop reactors, stirred tank reactors, batch reactors in parallel, series, and/or any combinations thereof. In the alternative, the linear low density polyethylene may be produced in a high pressure reactor. For example, the (linear low density) polyethylene according to the instant invention may be produced via gas phase polymerization process in a single gas phase reactor; however, the instant invention is not so limited, and any of the above polymerization processes may be employed. In one embodiment, the polymerization reactor may comprise of two or more reactors in series, parallel, or combinations thereof. Preferably, the polymerization reactor is one reactor, e.g. a fluidized bed gas phase reactor. In another embodiment, the gas phase polymerization reactor is a continuous polymerization reactor comprising one or more feed streams. In the polymerization reactor, the one or more feed streams are combined together, and the gas comprising ethylene and optionally one or more comonomers, e.g. one or more alpha-olefins, are flowed or cycled continuously through the polymerization reactor by any suitable means. The gas comprising ethylene and optionally one or more comonomers, e.g. alpha-olefins having 3 to 10 carbon atoms, may be fed up through a distributor plate to fluidize the bed in a continuous fluidization process.

In production, the catalyst composition of the invention, ethylene, optionally alpha-olefins having 3 to 10 carbon atoms, hydrogen, optionally one or more inert gases and/or liquids, e.g. $N_2$, isopentane, and hexane, and optionally one or more continuity additive, e.g. ethoxylated stearyl amine or aluminum distearate or combinations thereof, are continuously fed into a reactor, e.g. a fluidized bed gas phase reactor. Such fluidized bed gas phase reactor may be in fluid communication with one or more discharge tanks, surge tanks, purge tanks, and/or recycle compressors. The temperature in such reactor may for example be in the range of 70 to 115° C., preferably 75 to 110° C., more preferably 75 to 100° C., and the pressure may be in the range of 15 to 30 atm, preferably 17 to 26 atm. A distributor plate that may be present at the bottom of the polyethylene in the fluidized bed gas phase reactor provides a uniform flow of the upflowing monomer, comonomer, and inert gases stream. A mechanical agitator may also be provided to provide contact between the solid particles and the comonomer gas stream. The fluidized bed, a vertical cylindrical reactor, may have a bulb shape at the top to facilitate the reduction of gas velocity; thus, permitting the granular polyethylene to separate from the upflowing gases. The unreacted gases may then be cooled to remove the heat of polymerization, recompressed, and then recycled to the bottom of the reactor. The residual hydrocarbons may then be removed and the polyethylene produced may be transported under $N_2$ to a purge bin. Also, moisture may be introduced to reduce the presence of any residual catalyzed reactions with $O_2$ before the polyethylene is exposed to oxygen.

In the fluidized bed reactor, a monomer stream may be passed to a polymerization section. The fluidized bed reactor may include a reaction zone in fluid communication with a velocity reduction zone. The reaction zone includes a bed of growing polyethylene particles, formed polyethylene particles and catalyst composition particles fluidized by the continuous flow of polymerizable and modifying gaseous components in the form of make-up feed and recycle fluid through the reaction zone. Preferably, the make-up feed includes ethylene and optionally one or more alpha-olefins having 3 to 10 carbon atoms, and may also include condensing agents as is known in the art and disclosed in, for example, U.S. Pat. Nos. 4,543,399, 5,405,922, and 5,462,999.

It is preferable that the ethylene is present in the reactor at a partial pressure at or greater than 160 psia (1100 kPa), or 190 psia (1300 kPa), or 200 psia (1380 kPa), or 210 psia (1450 kPa), or 220 psia (1515 kPa). The comonomer, e.g. one or more alpha-olefins having 3 to 10 carbon atoms, if present in the polymerization reactor, is present at any level that will achieve the desired weight percent incorporation of the comonomer into the polyethylene. This may be expressed as a mole ratio of comonomer to ethylene as described herein, which is the ratio of the gas concentration of comonomer moles in the cycle gas to the gas concentration of ethylene moles in the cycle gas. In one embodiment of the inventive polyethylene composition production, the comonomer is present with ethylene in the cycle gas in a mole ratio range of from 0 to 0.1 comonomer to 1 mole of ethylene, for example in a mole ratio range of from 0 to 0.05, for example from 0 to 0.04, for example from 0 to 0.03, for example from 0 to 0.02 comonomer to 1 mole of ethylene.

Hydrogen gas may also be added to the polymerization reactor(s). For example, the ratio of hydrogen to total ethylene monomer (ppm $H_2$/mol % ethylene) in the circulating gas stream may be in the range from 0 to 60:1, for example from 0.10:1 to 50:1, for example from 0 to 35:1, for example from 0 to 25:1, for example from 7:1 to 22:1.

The optimal amount of catalyst component to be used in the polymerization can easily be determined by the person skilled in the art through routine experimentation. For example, the amount of catalyst component may be chosen such that the productivity is in the range from 1500 to 10000 gram polyolefin per gram catalyst.

During the polymerisation small amounts of scavenger, such as aluminum alkyl may also be added to the reactor in order to prevent impurities in the reactor from deactivating or poisoning the catalyst. Typical scavengers include triisobutyl aluminum, trihexyl aluminum, triisopropyl aluminum, triethylaluminum and trimethyl aluminum (TMA).

During the polymerisation of olefins a continuity aid agent (CAA) may also be added to the reactor. Said continuity aid agent is prepared separately prior to introduction into the reactor by reacting:
  at least one metal alkyl or metal alkyl hydride compound of a metal from group IIA or IIIA of the periodic system of elements, and
  at least one compound of general formula $R_m XR'_n$,
wherein
  R is a branched, straight, or cyclic, substituted or unsubstituted hydrocarbon group having 1 to 50, preferably 10-40, carbon atoms,
  R' is hydrogen or a functional group with at least one active hydrogen, for example an OH group
  X is a heteroatom selected from the group of O, N, P or S,
  n and m are each at least 1 and are such that the formula has no net charge,
  the molar ratio of the metal of the metal alkyl compound and X is about 2:1 to about 10:1.

Preferably the continuity aid agent is the same or different as the modifier present in the composition according to the present invention and is the product of reacting an aluminum compound of general formula (1)

(1)

with an amine compound of general formula (2)

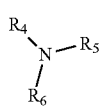

wherein R1, R2, R3, R4, R5 and R6 are as defined herein:
R1 is hydrogen or a branched or straight, substituted or unsubstituted hydrocarbon group having 1-30 carbon atoms,
R2 and R3 are the same or different and selected from branched or straight, substituted or unsubstituted hydrocarbon groups having 1-30 carbon atoms,
R4 is hydrogen or a functional group with at least one active hydrogen
R5 is hydrogen or a branched, straight or cyclic, substituted or unsubstituted hydrocarbon group having 1-30 carbon atoms,
R6 is a branched, straight or cyclic, substituted or unsubstituted hydrocarbon group having 1-30 carbon atoms.

The continuity aid agent is added to the reactor as a further process aid for reducing fouling and or sheeting. The amount is generally in the order of 0.01-0.1 mmol per gram of catalyst composition.

Therefore, the invention also relates to a method for the polymerisation of olefins comprising contacting olefins with the catalyst composition according to the invention in a reactor.

Therefore, in another aspect, the invention relates to a process for the polymerization of ethylene and optionally one or more alpha-olefins having 3 to 10 carbon atoms in a reactor comprising the steps of
i) adding the ethylene and optionally the one or more alpha-olefins having 3 to 10 carbon atoms to the reactor and
ii) adding the catalyst composition of the invention to the reactor to produce polyethylene.

Preferably, the invention relates to a process for the polymerization of ethylene and one or more alpha-olefins having 3 to 10 carbon atoms in a reactor comprising the steps of
i) adding the ethylene and optionally the one or more alpha-olefins having 3 to 10 carbon atoms to the reactor and
ii) adding the catalyst composition of the invention to the reactor to produce linear low density polyethylene.

It has been found that by using the process for the polymerization of ethylene and one or more alpha olefins having 3 to 10 carbon atoms of the invention, it is no longer necessary to separately add a reaction product of an amine compound and an aluminum compound to the reactor.

Therefore, in a special embodiment, the invention relates to a process for the polymerization of ethylene and optionally one or more alpha-olefins having 3 to 10 carbon atoms in a reactor comprising the steps of
i) adding the ethylene and optionally the one or more alpha-olefins having 3 to 10 carbon atoms to the reactor and
ii) adding the catalyst composition of the invention to the reactor to produce polyethylene, preferably linear low density polyethylene, wherein a reaction product of an amine compound, for example an amine compound of formula (1) with an aluminum compound, for example an aluminum compound of formula (2) is not added to the reactor as a separate component.

Surprisingly it has been found that the process for the production of polyolefins of the invention leads to less fouling and sheeting in the reactor. Also, the amount of fines in the reactor may be reduced by the process for the production of polyolefins of the invention.

Furthermore, it has been found that with the process of the invention, polyolefins, preferably linear low density polyethylene having very good processability can be produced.

Preferably, the polymerization process of the invention is conducted in the gas-phase.

In another aspect, the invention also relates to linear low density polyethylene, obtained or obtainable by polymerization of ethylene and an alpha-olefin having 3 to 10 carbon atoms in a reactor comprising the steps of
i) adding the ethylene and the alpha-olefin having 3 to 10 carbon atoms to the reactor and
ii) adding the catalyst composition of the invention to the reactor to produce linear low density polyethylene (LLDPE).

More in particular, the invention relates to linear low density polyethylene produced by polymerization of ethylene and an alpha-olefin having 3 to 10 carbon atoms in a reactor comprising the steps of
i) adding the ethylene and the alpha-olefin having 3 to 10 carbon atoms to the reactor and
ii) adding the catalyst composition of the invention to the reactor, preferably a gas phase reactor to produce linear low density polyethylene (LLDPE),
wherein the catalyst composition for the polymerization of olefins comprises a support containing a single site catalyst component, preferably a metallocene catalyst, a catalyst activator, preferably an aluminoxane and a modifier wherein the modifier is the product of reacting an aluminum compound of general formula (1)

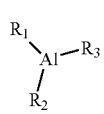

with an amine compound of general formula (2)

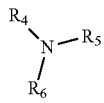

wherein
R1 is hydrogen or a branched or straight, substituted or unsubstituted hydrocarbon group having 1-30 carbon atoms,
R2 and R3 are the same or different and selected from branched or straight, substituted or unsubstituted hydrocarbon groups having 1-30 carbon atoms and
R4 is hydrogen or a functional group with at least one active hydrogen
R5 is hydrogen or a branched, straight or cyclic, substituted or unsubstituted hydrocarbon group having 1-30 carbon atoms,
R6 is a branched, straight or cyclic, substituted or unsubstituted hydrocarbon group having 1-30 carbon atoms, wherein the catalyst composition is prepared by a method comprising the steps of a) preparing the modifier by reacting the aluminium compound of general formula (1)

with the amine compound of general formula (2)

wherein R1, R2, R3, R4, R5 and R6 are as defined herein
b) activating the single site catalyst component by adding the catalyst activator to said single site catalyst component to obtain an activated single site catalyst component
c) combining in a solvent a support material, the activated single site catalyst component obtained in step b) and the modifier obtained in step a)
d) optionally drying the reaction product obtained in step c)

For example, in an ethylene-alpha olefin copolymer such as linear low density polyethylene (LLDPE), the alpha-olefin having 3 to 10 carbon atoms may be present in an amount of about 5 to about 20 percent by weight of the ethylene-alpha olefin copolymer, for example an amount of from about 7 to about 15 percent by weight of the ethylene-alpha olefin copolymer.

It has been found that with the process for the production of polyolefins of the invention, preferably a gas-phase process, it is possible to produce linear low density polyethylene having an excellent processability.

Therefore, in another aspect, the invention relates to a linear low density polyethylene
- having a density in the range from about 900 kg/m³ to less than about 940 kg/m³ as determined using ISO1872-2,
- having a molecular weight distribution ($M_w/M_n$) in the range from 2.5 to 3.5
- having an area under the peak in the temperature range from 20 to 40° C., for example in the temperature range from 25 to 35° C., determined using an analytical temperature rising elution fractionation analysis using 1,2-dichlorobenzene and a heating rate of 1° C./min, wherein the area is in the range from 5 to 20% of the sum of the areas under all peaks determined with the analytical temperature rising elution fractionation analysis.

In a different aspect, the invention relates to a linear low density polyethylene
- having a density in the range from about 900 kg/m³ to less than about 940 kg/m³ as determined using ISO1872-2,
- having a molecular weight distribution ($M_w/M_n$) in the range from 2.5 to 3.5
- having an area under the peak in the temperature range from 20 to 40° C., for example in the temperature range from 25 to 35° C., determined using an analytical temperature rising elution fractionation analysis using 1,2-dichlorobenzene and a heating rate of 1° C./min, wherein the area is in the range from 5 to 20% of the sum of the areas under all peaks determined with the analytical temperature rising elution fractionation analysis, wherein the linear low density polyethylene is produced by a process of the invention, for example by polymerization of ethylene and an alpha-olefin having 3 to 10 carbon atoms in a reactor comprising the steps of
i) adding the ethylene and the alpha-olefin having 3 to 10 carbon atoms to the reactor and
ii) adding the catalyst composition of the invention to the reactor, preferably a gas phase reactor to produce linear low density polyethylene (LLDPE)
wherein the catalyst composition for the polymerization of olefins comprises a support containing a single site catalyst component, preferably a metallocene catalyst, a catalyst activator, preferably an aluminoxane and a modifier wherein the modifier is the product of reacting an aluminum compound of general formula (1)

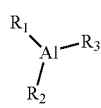

with an amine compound of general formula (2)

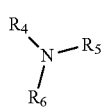

wherein
R1 is hydrogen or a branched or straight, substituted or unsubstituted hydrocarbon group having 1-30 carbon atoms,
R2 and R3 are the same or different and selected from branched or straight, substituted or unsubstituted hydrocarbon groups having 1-30 carbon atoms and
R4 is hydrogen or a functional group with at least one active hydrogen
R5 is hydrogen or a branched, straight or cyclic, substituted or unsubstituted hydrocarbon group having 1-30 carbon atoms,
R6 is a branched, straight or cyclic, substituted or unsubstituted hydrocarbon group having 1-30 carbon atoms, wherein the catalyst composition is prepared by a method comprising the steps of
a) preparing the modifier by reacting the aluminium compound of general formula (1)

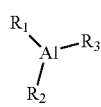

with the amine compound of general formula (2)

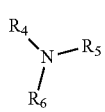

wherein R1, R2, R3, R4, R5 and R6 are as defined herein b) activating the single site catalyst component by adding the catalyst activator to said single site catalyst component to obtain an activated single site catalyst component c) combining in a solvent a support material, the activated single site catalyst component obtained in step b) and the modifier obtained in step a)

d) optionally drying the reaction product obtained in step c)

As used herein, the density of the linear low density polyethylene (LLDPE) is determined using ISO1872-2. For example, the density of the LLDPE may be at least 910, for example at least 915 and/or for example at most 940, for example at most 930, for example at most 925, for example at most 920 kg/m$^3$. For example the density of the LLDPE of the invention may be in the range from 915 to 925 kg/m$^3$.

As used herein with molecular weight distribution is meant the ratio between the weight average molecular weight (Mw) and the number average molecular weight (Mn). For purpose of the invention, the Mw and Mn are determined using SEC (Size Exclusion Chromatography using 1,2,4-trichlorobenzene as an eluent, and calibrated using linear polyethylene standards.

For example the molecular weight distribution of the LLDPE of the invention is at least 2.6, for example at least 2.7, for example at least 2.8, for example at least 2.9, for example at least 3.0 and/or for example at most 3.5, for example at most 3.4, for example at most 3.3. For example the molecular weight distribution of the LLDPE of the invention is in the range from 3.0 to 3.5 or for example in the range from 2.8 to 3.3.

The linear low density polyethylene of the invention preferably has an area under the peak in the temperature range from 20 to 40° C., for example in the temperature range from 25 to 35° C., determined using an analytical temperature rising elution fractionation analysis using 1,2-dichlorobenzene and a heating rate of 1° C./min, wherein the area is in the range from 5 to 20% of the sum of the areas under all peaks determined with the analytical temperature rising elution fractionation analysis.

For example, the area under the peak in the temperature range from 20 to 40° C. is at least 6%, for example at least 7% and/or for example at most 18%, for example at most 15%, for example at most 13%, for example at most 10%, for example at most 9% of the sum of the areas under all peaks. For example, the area under the peak in the temperature range from 20 to 40° C. is in the range from 5 to 10% of the sum of the areas under all peaks.

Preferably, in the LLDPE of the invention, the amount of zirconium (Zr) is in the range from 0.01 to 10 ppm, for example at least 0.1, for example at least 0.2, for example at least 0.3, for example at least 0.4 and/or for example at most 8, for example at most 5, for example at most 3, for example at most 1 ppm based on the linear low density polyethylene.

Preferably, the LLDPE of the invention substantially does not contain chromium, titanium or hafnium, that is the LLDPE of the invention does not or only contains what would be considered by the person skilled in the art, trace amount of chromium, titanium of hafnium, for example less than 0.001 ppm.

For purpose of the present invention, the amount of zirconium, chromium, titanium or hafnium is determined using x-ray fluorescence (XRF), which is calibrated to reference standards. At concentrations below 1 ppm, ICP-MS (Inductively coupled plasma coupled to mass spectrometry) is the preferred method of determining metal residues present in the LLDPE of the invention.

Preferably, the total CH$_3$ per 1000 carbon atoms as determined using $^{13}$C NMR is at least 15 and preferably at most 18. The total CH$_3$ per 1000 carbon atoms is a measure for the amount of alpha-olefins having 3 to 10 carbon atoms incorporated into the LLDPE.

Preferably, the LLDPE of the invention is a copolymer of ethylene with hexene. The amount of hexene in the LLDPE as determined using $^{13}$C NMR is for example at least 7 and at most 10 mol % based on mole ethylene in the LLDPE.

Preferably, the LLDPE of the invention does not have a reverse comonomer composition distribution.

A reverse comonomer composition distribution, as used herein, refers to a polymer in which the higher molecular weight components of the polymer have higher comonomer incorporation than the lower molecular weight components. With reverse comonomer composition distribution, there is increasing comonomer incorporation with increasing molecular weight. For purpose of the invention with reverse comonomer composition distribution is meant that the amount of comonomer incorporation at higher molecular weights is at least more than 10%, for example at least more than 20% higher, for example at least more than 30% higher, than at lower molecular weights.

Preferably, the LLDPE of the invention also does not have a Ziegler Natta comonomer composition distribution. A Ziegler Natta comonomer composition distribution, as used herein, refers to a polymer in which the lower molecular weight components of the polymer have higher comonomer incorporation than the higher molecular weight components. With Ziegler Natta comonomer composition distribution, there is decreasing comonomer incorporation with increasing molecular weight. For purpose of the invention with Ziegler Natta comonomer composition distribution is meant that the amount of comonomer incorporation at lower molecular weights it at least more than 10%, for example at least more than 20% higher, for example at least more than 30% higher, than at higher molecular weights.

Preferably, the LLDPE of the invention has homogeneous comonomer composition distribution. For purpose of the invention with homogeneous comonomer composition distribution is meant that the comonomer incorporation stays about the same with increasing molecular weight, specifically, that the amount of comonomer incorporation at lower molecular weights is at most 30%, for example 20%, for example 10% higher than at higher molecular weights and that the amount of comonomer incorporation at higher molecular weights is at most 30%, for example at most 20%, for example at most 10% higher than at lower molecular weights.

The comonomer composition distribution can be determined using SEC-IR (Size Exclusion Chromatography coupled to an Infrared detector).

Preferably, the linear low density polyethylene of the invention is substantially free of long chain branching. Substantially free of long chain branching as used herein, refers to a linear low density polyethylene substituted with less than 0.1 long chain branching per 1000 carbon atoms, more preferably less than 0.01 long chain branching per 1000 carbon atoms. Most preferably, the linear low density polyethylene of the invention is free of long chain branching, that is the linear low density polyethylene of the invention does not contain long chain branches. As used herein, long chain branching (LCB) is determined according to methods known in the art, for example gel permeation chromatography coupled with low angle laser light scattering detector (GPC-LALLS) or with gel permeation chromatography coupled with a different viscometer detector (GPC-DV).

Preferably, the linear low density polyethylene of the invention has a melt flow rate as determined using ASTM D-1238-10, condition E (190° C., 2.16 kg) in the range from 0.5 to 100 dg/min. For example the LLDPE of the invention has a melt flow rate in the range from 0.5 to 30 dg/min, for example in the range from 0.5 to 20 dg/min, for example in the range from 0.5 to 5 dg/min, for example in the range from 0.5 to 3.5 dg/min.

Preferably, the LLDPE of the invention has a high load melt index as determined using ASTM D-1238-10, condition F (190° C., 21.6 kg) in the range from 10 to 100 dg/min, for example in the range from 10 to 100 dg/min, for example in the range from 10 to 40 dg/min, for example in the range from 15 to 25 dg/min, for example in the range from 16 to 20 dg/min.

Preferably, the linear low density polyethylene of the invention has a solubility in hexane as measured using ASTM D5227-01 (2008) of less than 5.5 wt %, for example of less than 5 wt %, for example less than 4 wt %, for example less than 3 wt %, for example less than 2.6 wt %, for example less than 1.5 wt %, for example less than 1 wt %. A low solubility in hexane makes the LLDPE of the invention suitable for the preparation of articles that contact food and, when lower than 2.6 wt % in particular also for articles that are for packing or holding food during cooking.

Preferably, the linear low density polyethylene of the invention has a crystallization temperature ($T_c$) in the range from 100 to 140° C. as determined using Differential Scanning Calorimetry according to ASTM D 3418-08 using a scan rate of 10° C./min on a sample of 10 mg and using the second heating cycle, for example a crystallization temperature in the range from 100 to 120° C.

The invention also relates to a composition comprising linear low density polyethylene of the invention and further comprising additives, for example additives as described herein.

Optionally, additives may be added to the polyolefin, preferably LLDPE, obtained or obtainable by the method of the present invention. The additives may for example be added during the melt-mixing. Examples of suitable additives include but are not limited to the additives usually used for polyethylene, for example antioxidants, nucleating agents, acid scavengers, processing aids, lubricants, surfactants, blowing agents, ultraviolet light absorbers, quenchers, antistatic agents, slip agents, anti-blocking agents, antifogging agents, pigments, dyes and fillers, and cure agents such as peroxides. The additives may be present in the typically effective amounts well known in the art, such as 0.001 weight % to 10 weight % based on the total composition.

Therefore, the invention also relates to a composition comprising the polyolefins of the invention and further comprising additives, for example to a composition consisting of the polyolefin of the invention and additives.

Therefore, in another aspect, the invention also relates to a process for the preparation of the composition of the invention further comprising the step of melt-mixing the polyolefin of the invention and optional additives.

Before melt-mixing, the polyolefin of the invention and the optional additives may be pre-mixed in a mixer, for example a dry blender (as may be purchased from Henschell). The polyethylene and the additives may be pre-mixed and/or melt-mixed in the form of a powder or granules but may also be melt-mixed in the form of pellets.

After the melt-mixing, the composition obtained in the melt-mixing may be pelletized.

With melt-mixing is meant that the polyolefin and additives are mixed at a temperature that exceeds the Tm or Tc of the polyolefin. Melt-mixing may be done using techniques known to the skilled person, for example in an extruder, for example a single screw or twin screw extruder, preferably a twin screw extruder.

Suitable conditions for melt-mixing, such as temperature, pressure, amount of shear, screw speed and screw design when an extruder is used are known to the skilled person.

When using an extruder, a conventional extruder such as a twin-screw extruder may be used. The temperature can vary through the different zones of the extruder as required. For example, the temperature may vary from 180° C. in the feed zone to 300° C. at the die. Preferably, the temperature in the extruder varies from 165 to 250° C.; likewise, the screw speed of the extruder may be varied as needed. Typical screw speeds are in the range from about 100 rpm to about 400 rpm.

The polyolefins of the invention and compositions comprising said polyolefins may suitably be used for the manufacture of articles. For example, the polyolefins and compositions of the invention may be manufactured into film, for example by compounding, extrusion, film blowing or casting and all methods of film formation to achieve, for example uniaxial or biaxial orientation. Examples of films include blown or cast films formed by coextrusion (to form multilayer films) or by lamination and may be useful as films for packaging, for example as shrink film, cling film, stretch film, sealing films, oriented films, snack packaging, heavy duty bags, grocery sacks, baked and frozen food packaging, medical packaging, industrial liners, membranes, etc. in food-contact and non-food contact applications, agricultural films and sheets.

Therefore, the invention also relates to articles comprising polyolefins of the invention, for example to articles comprising LLDPE of the invention.

Therefore, in another aspect, the invention also relates to films comprising polyolefins of the invention, in particular to films comprising LLDPE of the invention or the compositions of the invention.

It has been found that the LLDPE of the invention can suitably be used for the preparation of a film having improved optical properties, for example a low haze and/or a high gloss. Furthermore, the LLDPE of the invention may also be used for the preparation of a film having improved hot tack and/or seal strength properties and/or a lower seal initiation temperature.

Therefore, in another embodiment, the invention relates to a film comprising the linear low density polyethylene of the invention or the composition of the invention.

Preferably, the film comprises at least 80 wt % of LLDPE of the invention, for example at least 85 wt %, for example at least 90 wt %, for example at least 95 wt %, for example at least 96 wt %, for example at least 97 wt %, for example at least 98 wt %, for example at least 99 wt % of the LLDPE of the invention. For example, the film consists of LLDPE of the invention or of the composition comprising LLDPE and additives, for example the composition consisting of LLDPE and additives of the invention.

Preferably, the film according to the invention has a gloss 45° angle as determined using ASTM D-2457-08 of at least 50, for example at least 60, for example at least 70, for example at least 75.

Preferably, the film according to the invention has a gloss 60° angle as determined using ASTM D-2457-08 of at least 80, for example at least 90, for example at least 100, for example at least 110.

Preferably, the film according to the invention has a haze as determined using ASTM D-1003-11 of less than 10, for example of less than 9, for example of less than 8, for example of less than 7, for example of less than 6.

Preferably, the film according to the invention has an average seal strength as determined using ASTM F88-06 in the temperature range from 105 to 140° C. of at least 10N/24 mm, for example at least 10.5N/24 mm and for example at most 15N/24 mm, for example at most 14N/24 mm.

Preferably, the film according to the invention has an average hot tack strength as determined using ASTM F1912-98 in the temperature range from 105 to 120° C. of at least 1.5N/15 mm, for example at least 1.7 N/15 mm and for example at most 4N/15 mm, for example at most 3N/15 mm.

The films of the present invention may be prepared by any method known in the art, for example by a blown film extrusion process. The thickness of the film may be chosen in any range, for example in the range of 1 to 500 μm, for example in the range from 5 to 100 μm, for example in the range from 20 to 50 μm.

The films of the present invention may be heat sealed to produce an article, for example a packaging article. Heat sealing may for example be done by sealing equipment such as a compression packaging machine as for example disclosed in U.S. Pat. No. 3,753,331.

Therefore, in another aspect, the invention relates to an article comprising the linear low density polyethylene of the invention, the composition of the invention or the film of the invention.

For example, the article, maybe a film that is heat sealed into a package. In another aspect, the invention relates to the use of the film according to the invention for the preparation of an article, for example for the preparation of a package In another aspect, the invention relates to a process for the preparation of a film according to the invention, wherein the film is prepared by a blown film extrusion process.

Although the invention has been described in detail for purposes of illustration, it is understood that such detail is solely for that purpose and variations can be made therein by those skilled in the art without departing from the spirit and scope of the invention as defined in the claims.

It is further noted that the invention relates to all possible combinations of features described herein, preferred in particular are those combinations of features that are present in the claims.

It is further noted that the term 'comprising' does not exclude the presence of other elements. However, it is also to be understood that a description on a product comprising certain components also discloses a product consisting of these components. Similarly, it is also to be understood that a description on a process comprising certain steps also discloses a process consisting of these steps.

The invention is now elucidated by way of the following examples, without however being limited thereto.

SHORT DESCRIPTION OF THE FIGURES

In FIG. 2, T stands for the temperature in ° C. and wherein DD stands for the differential distribution dC/dT.

In FIG. 3, T stands for the temperature in ° C. and wherein DD stands for the differential distribution dC/dT.

In FIG. 4, T stands for the temperature in ° C. and wherein DD stands for the differential distribution dC/dT.

EXAMPLES

Experimental Conditions

Figure 1:
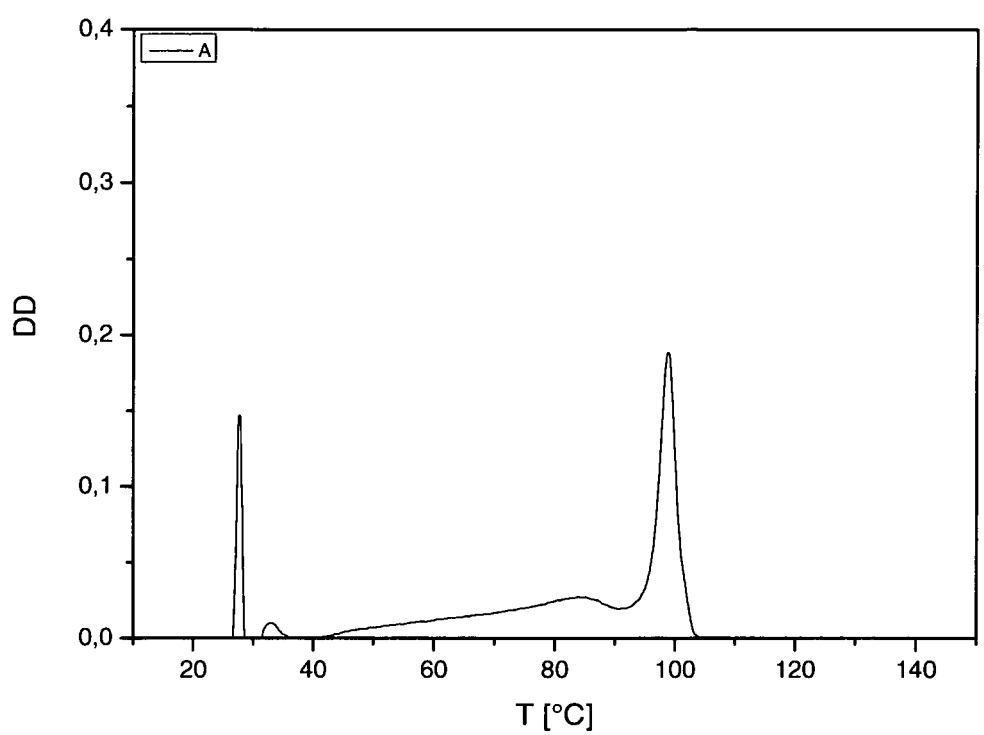
FIG. 1 (FIG. 1) shows the aTREF of the LLDPE of comparative example A, wherein T stands for the temperature in ° C. and wherein DD stands for the differential distribution dC/dT.
Figure 2:
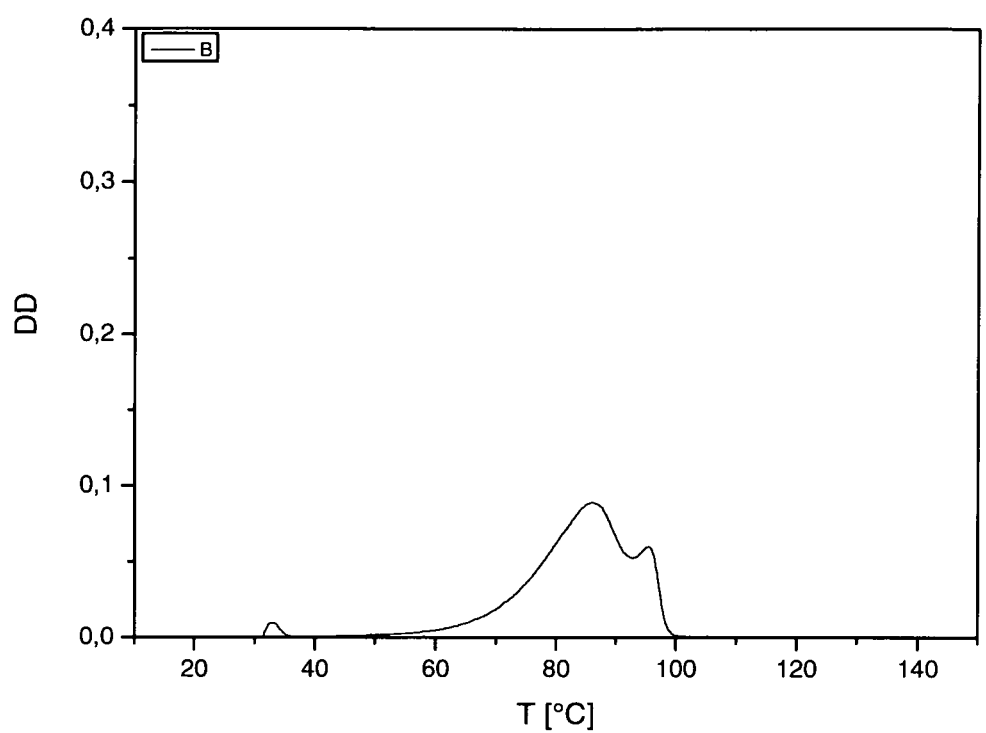
FIG. 2 (FIG. 2) shows the aTREF of the LLDPE of comparative example B.
Figure 3:
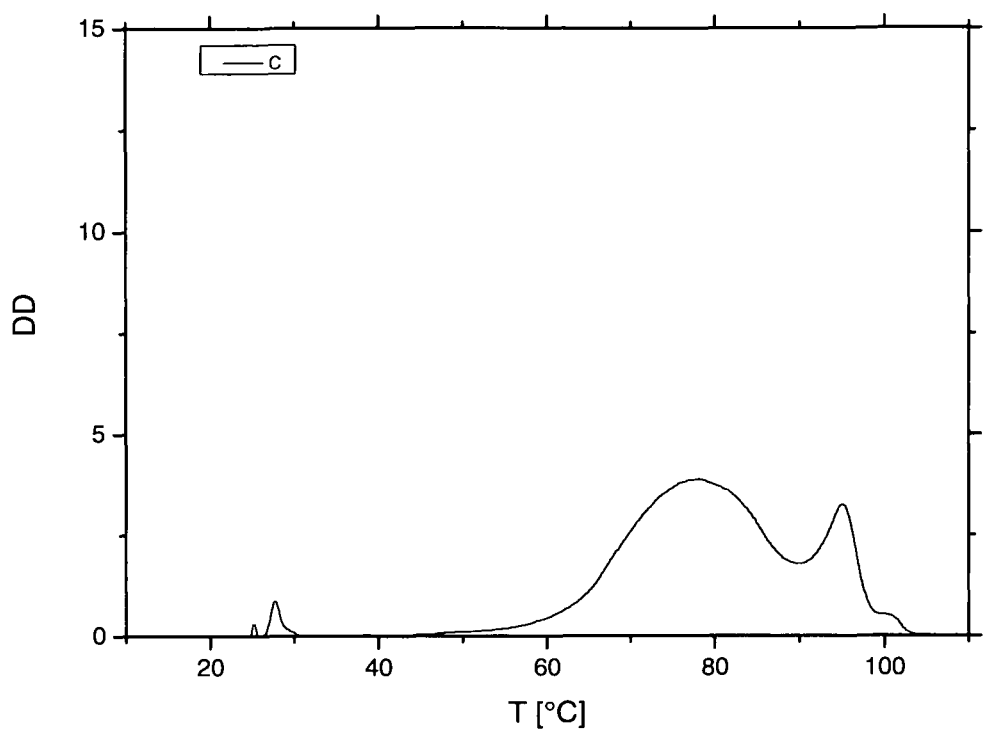
FIG. 3 (FIG. 3) shows the aTREF of the LLDPE of comparative example C.
Figure 4:
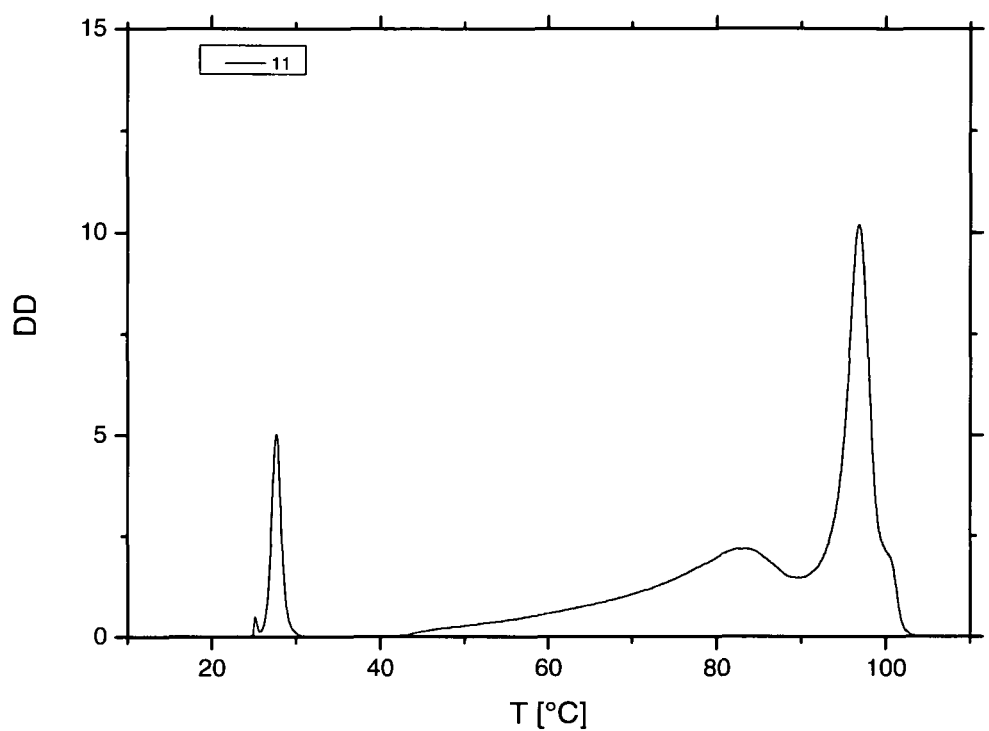
FIG. 4 (FIG. 4) shows the aTREF of the LLDPE of example 11.

All materials were handled in a nitrogen atmosphere using either Schlenk techniques or a nitrogen filled glove box. Nitrogen and isopentane were supplied from a plant source and were dried through an additional bed of molecular sieves, if necessary. All other solvents were first dried over molecular sieves and if necessary sodium/potassium amalgam. The catalysts were prepared using temperature controlled to within 0.5° C. in a silicon oil bath with stirring. Most reagents were used as received from the manufacturer or supplier.

Example 1

Preparation of Modifiers

Several modifiers according to the invention were prepared as indicated in Table 1 below.

TABLE 1

| Modifier | AL:N* molar ratio | Description |
|---|---|---|
| A | 1:1 | At room temperature, add slowly neat 2.47 gram of triisobutylaluminum to a solution of octadecylamine (3.35 gram in 25 ml of isopentane). Remove isopentane under vacuum. The product is high boiling point liquid. |
| B | 1.6:1 | At room temperature, add slowly neat 4.04 gram triisobutylaluminum to a solution of octadecylamine (3.35 gram in 25 ml of isopentane). Remove isopentane under vacuum. The product is high boiling point liquid. |

TABLE 1-continued

| Modifier | AL:N* molar ratio | Description |
|---|---|---|
| C | 3:1 | At room temperature, add slowly neat 7.41 gram triisobutylaluminum to a solution of octadecylamine (3.3490 gram in 25 ml of isopentane). Remove isopentane under vacuum. The product is high boiling point liquid. |
| D | 1:1 | At room temperature, add slowly neat 2.53 gram triisobutylaluminum to a solution of 2-ethylhexylamine (1.54 gram in 50 ml of toluene). |
| E | 1:1 | At room temperature, add slowly neat 0.11 ml triisobutylaluminum to a solution of Atmer 163 (0.130 g of Atmer 163 in 5 ml of toluene). Atmer 163 is a synthetic ethoxylated amine. |

*AL:N means molar ratio of aluminum (Al) to nitrogen (N)

Examples 2-4

In Examples 2-4 several catalyst compositions were tested. 0.0880 gram of metallocene catalyst component biphenyl (2-indenyl)$_2$ZrCl$_2$ was activated separately by adding to the catalyst component 10.7 ml of MAO (10 wt % solution in toluene). In a reaction flask, 10 ml of toluene was added to 5 gram of silica (Grace 955 obtained from Aldrich Chemical Co.) as a support. The activated catalyst component was then transferred to the silica support and the mixture was allowed to react at a temperature of about 50° C. for 1 hour.

A modifier was then added to the reaction mixture, after which reaction was allowed to continue for 30 minutes followed by vacuum drying of the catalyst composition. The catalyst compositions contained 0.244 wt % of Zr and 7.2 wt % of Al (originating from the MAO; additional Al content originating from the modifier not included). This resulted in a molar ratio of Al/Zr of about 100.

Flow properties of the dry catalyst composition were judged visually.

The catalyst composition was tested in an ethylene slurry homopolymerisation process. Productivity in terms of gram PE per gram catalyst composition was determined and after the reaction the reactor was inspected for fouling and/or sheeting.

The results can be found in Table 2 below.

TABLE 2

| Ex. | Modifier | Flowability | Fouling/ sheeting | Productivity [gram PE/gram Cat.] |
|---|---|---|---|---|
| 2 | Modifier A 0.195 gram in 5 ml toluene | Excellent | None | 6500 |
| 3 | Modifier B 0.195 gram in 5 ml toluene | Excellent | None | 3783 |
| 4 | Modifier C 0.195 gram in 5 ml toluene | Excellent | None | 2967 |

Example 5

Example 5 is similar to Examples 2-4.

4.380 gram of metallocene catalyst component biphenyl (2-indenyl)$_2$ZrCl$_2$ was activated separately by adding to the catalyst component 531 ml of MAO (10 wt % solution in toluene). In a reaction vessel, 600 ml of toluene was added to 250 gram of silica (Grace 955 obtained from Aldrich Chemical Co.) as a support. The activated catalyst component was then transferred to the silica support and the mixture was allowed to react while being stirred at a temperature of about 50° C. for 1 hour.

The solution of modifier D above was then added to the reaction mixture, after which reaction was allowed to continue for 30 minutes followed by vacuum drying of the catalyst composition. The catalyst composition contained 0.24 wt % of Zr and 7.2 wt % of Al (originating from the MAO; additional Al content originating from the modifier not included). This resulted in a molar ratio of Al/Zr of about 100. The flowability of this catalyst was excellent. No reactor sheeting or fouling was observed and the productivity was 2050 gram PE/gram catalyst.

Examples 6-8

Fluid-Bed Polymerisation

The supported catalyst of Examples 2-4 of Table 4 were tested in a continuous gas phase fluidized bed reactor having an internal diameter of 45 cm and a reaction zone height of 140 cm. The bed of polymer particles in the reaction zone is kept in a fluidized state by a recycle stream that works as a fluidizing medium as well as a heat dissipating agent for absorbing the exothermal heat generated within reaction zone. The reactor was kept at a constant temperature of about 87° C. and at a constant pressure of about 21.7 bar. Ethylene and hexene were used as the raw materials for polymerisation. These materials form a make-up stream. A Continuity Aid Agent (CAA) was mixed with the make-up stream as a 2% by weight solution in isopentane carrier solvent. The catalyst composition contained biphenyl(2-indenyl)$_2$ZrCl$_2$ as the catalyst component.

The solid catalyst composition was injected directly in the reaction zone of the fluidized bed using purified nitrogen as a carrier gas. The injection rate was adjusted to maintain a constant production rate of about 12 kg/hr. The produced polymer was discharged from the reaction zone semi-continuously via a series of valves into a fixed volume chamber. The so obtained product was purged to remove any volatile hydrocarbons and was then treated with humidified nitrogen to deactivate any trace quantities of residual catalyst composition. The properties of the polymer were determined by the following test methods:

TABLE 3

| | |
|---|---|
| Melt Index | ASTM D-1238-10 Condition E (190° C., 2.16 kg) |
| Melt Index | ASTM D-1238-10 Condition F (190° C., 21.6 kg) |
| Density | ISO1872-2. The samples were prepared and pressed according to ISO1872-2 and annealed by boiling in water for half an hour, then left to cool for 16 hours in the same water after which the samples were measured. |
| Bulk Density | The resin is poured in a fixed volume cylinder of 400 cc. The bulk density is measured as the weight of resin divided by 400 cc to give a value in g/cc. |
| Average Particle Size | The particle size is measured by determining the weight of material collected on a series of U.S. Standard sieves and determining the weight average particle size based on the sieve series used. |
| Fines | fines are defined as the percentage of the total distribution passing through a 120 mesh standard sieve. This has a particle size equivalent of 120 microns. |
| Tm | Tm is determined according to ASTM D3418-08 as follows: Samples weighing approximately 5-10 mg are sealed in aluminum sample pans. The DSC data is recorded by first cooling the sample to −50° C. and then gradually heating it to 200° C. at a rate of 10° C./min. The sample is kept at 200° C. for 5 minutes before a second cooling-heating cycle is applied. Both the first and second cycle thermal events are recorded. The melting temperature is |

TABLE 3-continued

| | |
|---|---|
| | measured and reported during the second heating cycle (or second melt). |
| Solubility in hexane | ASTM D5227-01(2008). Film samples are extracted with hexane for 2 hours at 49.5° C. ± 0.5° C., dried and weighed. The loss in weight of the film is the solubility in hexane. |
| Molecular weight distribution (Mw/Mn) | Sample preparation
The polymer samples were dissolved (0.1 w %) in 1,2,4-trichlorobenzene (TCB), which was distilled prior to use, over a period of 4 h at 150° C. under nitrogen and stabilized with di-tertbutylparacresol (DBPC) at a concentration of 1 g/L. The solutions were filtered at high temperature (150° C.) using a millipore filtration setup (1.2 μm) positioned in a Hereous LUT oven operating at 150° C.
SEC-DV measurement
The separation of the polymer according to molar mass is performed with a PL-GPC220 equipped with PL BV-400 viscosimeter and refractive index detector. This SEC system is operated at high temperature (column compartment at 150° C., injector compartment at 150° C., and solvent reservoir at 60° C.) and a flow of 1.0 mL/min. Four Polymer Laboratories GPC columns (PL 13 μm mixed Olexis columns) were used. Calculations were performed with Viscotek TriSEC 2.7 software. The eluent used was 1,2,4-trichlorobenzene. The columns were calibrated using linear polyethylene standards. |

TABLE 4

| Example | 6 | 7 | 8 |
|---|---|---|---|
| Zr (wt %) | 0.18 | 0.20 | 0.24 |
| Ethylene (mole %) | 46.0 | 46.0 | 46.0 |
| Hexene (mole %) | 5.29 | 5.25 | 5.22 |
| Continuity Aid Agent (ppm) | 50 | 50 | 50 |
| Catalyst Productivity (kg/kg) | 5,870 | 6,050 | 6,700 |
| Residual Ash (ppm) | 155 | 150 | 140 |
| Melt Index-MI (dg/min) | 1.03 | 1.02 | 0.99 |
| Density (g/cc) | 0.9190 | 0.9187 | 0.9183 |
| Bulk Density (g/cc) | 0.372 | 0.375 | 0.377 |
| Average Particle Size (microns) | 860 | 895 | 938 |
| Fines (%) | 0.1 | 0.1 | 0.1 |

As can be seen from the results presented in Table 4, polyolefins such as LLDPE can be produced with the catalyst composition of the invention with a minimal amount of fines, which means that fouling and/or sheeting in gas phase and slurry polymerization processes will also be minimal.

Example 9

Large Scale Preparation of the Catalyst Composition of the Invention

At room temperature, 0.595 kg of diphenyl(2-indenyl)$_2$ZrCl$_2$ was added to 36.968 kg of a 30% methylaluminoxane solution (Al content 13.58 wt %) and stirred for 30 minutes to form activated metallocene. About 172 kg of dry toluene was added to 43 kg of silica 955 to form a silica slurry. At about 30° C., the activated metallocene was added to the silica slurry under agitation. After the activated metallocene was added, the temperature was increased to 50° C. After 2 hours at 50° C., all of modifier F (Table 5) was added. After addition the mixture was kept at 50° C. for 1 hour. The reaction temperature was then reduced to 30° C. The toluene was removed by filtration and the obtained catalysts composition was dried by raising the temperature to 55° C. and using a flow of warm nitrogen. The Al/Zr ratio used in this experiment was approximately 150.

TABLE 5

| | |
|---|---|
| Modifier F | At room temperature, add slowly 0.114 kg of neat triisobutylaluminum to a solution of 0.057 kg of cyclohexylamine in 9.7 kg of dry toluene. |

The catalyst composition obtained had an excellent flow as judged visually.

Example 10

The catalyst composition was tested in an ethylene slurry polymerisation process. After the reaction, the reactor was inspected for fouling and/or sheeting and no fouling/sheeting was observed.

Example 11

Also, the properties of the polymer prepared were tested using the methods as indicated herein.

The properties were compared to the properties of other linear low density polyethylenes.

Comparative Example A: LLDPE 6118NE from Saudi Basic Industries Corporation

Comparative Example B: LLDPE Exceed® 1018CA (Lot: M07120316C (USA)) from Exxon Mobile Comparative Example C: LLDPE Eltex® PF6212LA from Ineos Polyolefins Example 11: LLDPE Produced in Example 10; Example According to the Invention The properties of the materials are indicated in Table 6 below:

TABLE 6

LLDPEs used and their properties.

| Ex | MI$_{2.16}$ | D | Cat. | LCB | Comonomer | incorporation |
|---|---|---|---|---|---|---|
| A | 0.84 | 921.4 | ZN | No | 1-hexene | Ziegler Natta |
| B | 0.9 | 920.1 | M | No | 1-hexene | homogeneous |
| C | 1.34 | 919.5 | M | Yes | 1-hexene | reverse |
| 11 | 0.99 | 920.5 | M | No | 1-hexene | homogeneous |

MI$_{2.16}$: melt flow index, measured according to ASTM D-1238-10 Condition E (190° C. 2.16 kg) in dg/min
D: density (kg/m$^3$)
Cat: catalyst
LCB: long chain branching
ZN: Ziegler Natta
M: Metallocene
incorporation: the comonomer composition distribution, that is the distribution of the short chain branching (butyl branches due to incorporation of the 1-hexene comonomer) as a function of the molecular weight.

TABLE 7

Properties of LLDPE produced in example 11 (modifier F) compared to comparative examples

| Example/property | A | B | C | 11 |
|---|---|---|---|---|
| Density (kg/m$^3$) | 921.4 | 920.1 | 919.5 | 920.5 |
| M$_w$/M$_n$ | 4.6 | 2.6 | 4.2 | 3.2 |
| Zr | <0.01 | <0.01 | | 0.1-1 |
| Total CH$_3$ per 1000 carbon atoms | 16.7 | 12.5 | 16.1 | 16.8 |

TABLE 7-continued

Properties of LLDPE produced in example 11
(modifier F) compared to comparative examples

| Example/property | A | B | C | 11 |
|---|---|---|---|---|
| Butyl branches (hexane) per 1000 C (wt %) | 16.0 (9.6) | 12.0 (7.3) | 15.2 (8.3) | 16.1 (9.4) |
| Melt flow rate (190° C., 2.16 kg) | 0.84 | 0.9 | 1.34 | 0.99 |
| Solubility in hexane (wt %) | | <0.6 | | <1.0 |
| Crystallization temp. (° C.) | 66 | 67 | 64 | 68 |
| (main peak at higher temperature) | 111.2 | 106.0 | 104.8 | 109.7 |

An analytical temperature rising elution fractionation (aTREF) was performed on the examples of comparative examples A-C and of example 11.

Analytical temperature rising elution fractionation (ATREF) analysis was conducted according to the method described in U.S. Pat. No. 4,798,081 and Wilde, L.; Ryle, T. R.; Knobeloch, D. C; Peat, L R.; Determination of Branching Distributions in Polyethylene and Ethylene Copolymers, J. Polym. ScL, 20, 441-455 (1982), which are incorporated by reference herein in their entirety. The composition to be analyzed was dissolved in 1,2-dichlorobenzene of analytical quality filtrated via 0.2 µm filter and allowed to crystallize in a column containing an inert support (Column filled with 150 µm stainless steel beans (volume 2500 µL) by slowly reducing the temperature to 20° C. at a cooling rate of 0.1° C./min. The column was equipped with an infrared detector. An ATREF chromatogram curve was then generated by eluting the crystallized polymer sample from the column by slowly increasing the temperature of the eluting solvent (1,2-dichlorobenzene) from 20 to 130° C. at a rate of 1° C./min.

The instrument used was Polymer Char Crystaf-TREF 300.

Stabilizers: 1 g/L Topanol+1 g/L Irgafos 168

Sample: approx. 70 mg in 20 mL

Sample volume: 0.3 mL

Pump flow: 0.50 mL/min

The software from the Polymer Char Crystaf-TREF-300 was used to generate the spectra.

The results are presented in FIGS. 1-4 and in Table 8 below. In Table 8, the peak temperature of the peaks is indicated with the area as a percentage of the sum of the areas under all peaks determined with aTREF.

TABLE 8

| Ex. | Peak 1: | Peak 2: | Peak 3: |
|---|---|---|---|
| A | 97.8° C./51.4% | 79.9° C./35.4% | 35° C./13.1% |
| B | 94.4° C./24.5% | 84.5/75.1% | 35° C./~0.5% |
| C | 95.1/20.9% | 78.1/77.7% | 35° C./1.4% |
| 11 | 96.8° C./46.5% | 83.3° C./46.0% | 35° C./7.5% |

As can be seen from Table 8, the LLDPE according to the invention has an area under the peak in the temperature range from 20 to 40° C., for example in the temperature range from 25 to 35° C., determined using an analytical temperature rising elution fractionation analysis using 1,2-dichlorobenzene and a heating rate of 1° C./min, wherein the area is in the range from 5 to 20% of the sum of the areas under all peaks determined with the analytical temperature rising elution fractionation analysis Example 11

Preparation of Film

The LLDPE powder produced in example 10 was melt-mixed with suitable additives in a twin screw extruder to produce LLDPE pellets. It was found that the LLDPE powder had a very good processability.

Single layer films of 25 µm were produced from the LLDPE pellets on a Brabender blown film line, having a frost line height of 30 cm using a blow up ratio of 2.5 and a die thoughput of 3.0 kg/hr/cm. (output 60 kg/h)

The line was equipped with a Ø 200 mm die, a die gap of 2.3 mm, reversing haul-off, chilled cooling air, thickness profile measurement and back to back winder. The overall throughput was kept constant. Barrel temperature profiles were ramped from 170° C. at the feed section to 200° C. at the die.

The properties of the film were measured according to the methods mentioned in Table 9.

TABLE 9

| Property | Measurement method |
|---|---|
| Gloss 45° angle and Gloss 60° angle | ASTM D-2457-08 |
| Haze | ASTM D-1003-11 |
| Hot tack strength | ASTM F1912-98 |
| Seal force | ASTM F88-06 |

The example was repeated for the LLDPEs of comparative examples A-C.

It was found that the LLDPE of the invention showed a better processability in the extruder as compared to comparative examples A-C.

The results for the gloss and haze are given in Table 10 below.

TABLE 10

Gloss and haze of single layer films of 25 µm
of comparative examples A-C and of example 11.

| Example/property | A | B | C | 11 |
|---|---|---|---|---|
| Gloss 45° angle | 38.9 | 67 | 64.7 | 76.3 |
| Gloss 60° angle | | 76.2 | | 122.4 |
| Haze | | 12.9 | | 5.1 |

As can be seen from Table 10, film comprising LLDPE of the invention has excellent optical properties (high gloss and low haze). The results for the seal force and hot tack strength of the films are given in FIG. 5-FIG. 12.

Figure 5:
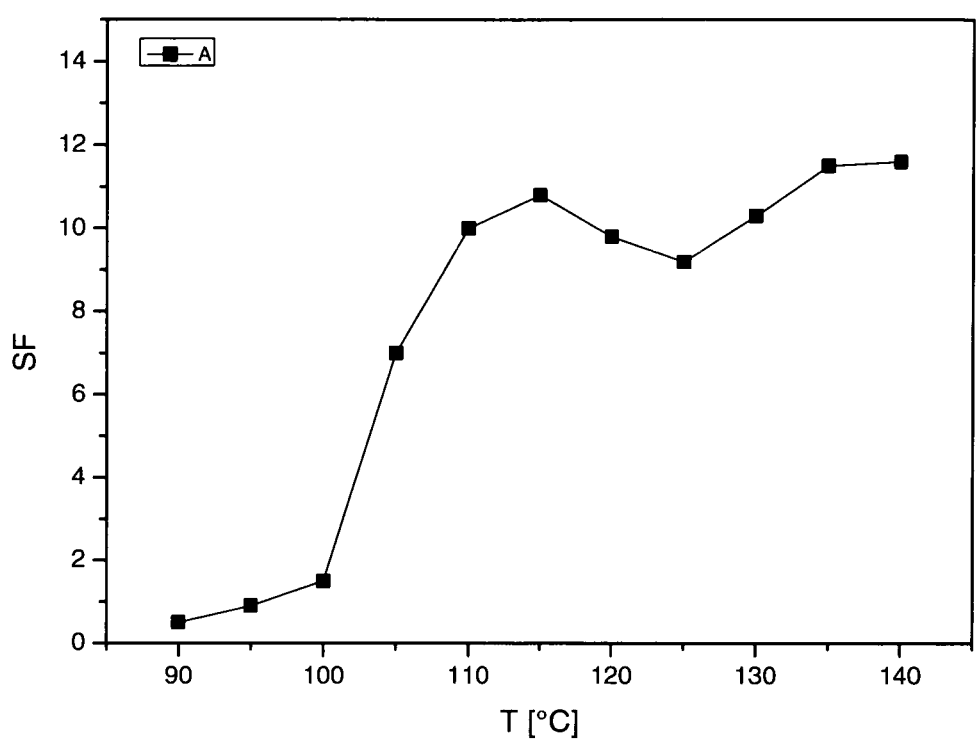
FIG. 5 (FIG. 5) shows the seal force SF (N/24 mm) of the LLDPE of comparative example A as a function of the temperature T (° C.).
Figure 6:
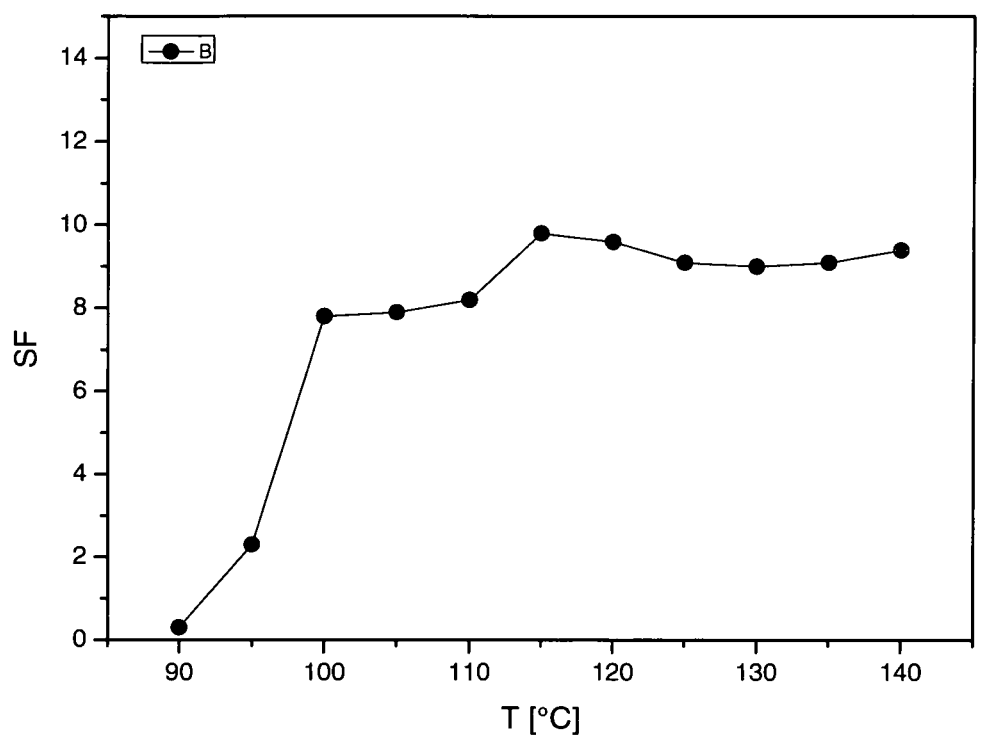
FIG. 6 (FIG. 6) shows the seal force SF (N/24 mm) of the LLDPE of comparative example B as a function of the temperature T (° C.).
Figure 7:
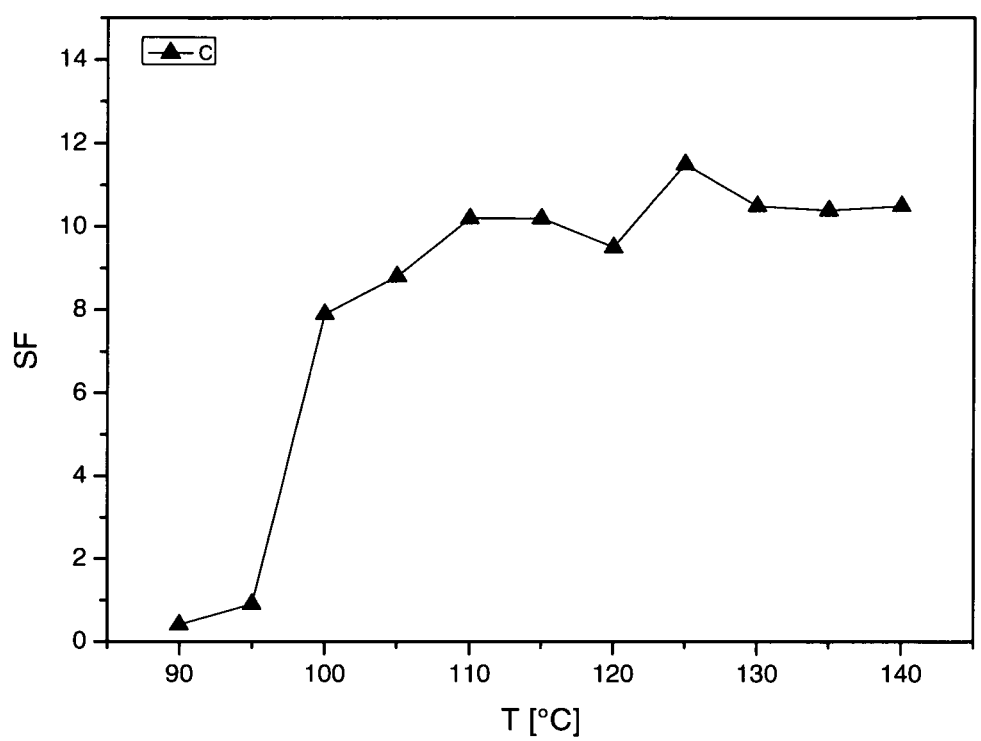
FIG. 7 (FIG. 7) shows the seal force SF (N/24 mm) of the LLDPE of comparative example C as a function of the temperature T (° C.).
Figure 8:
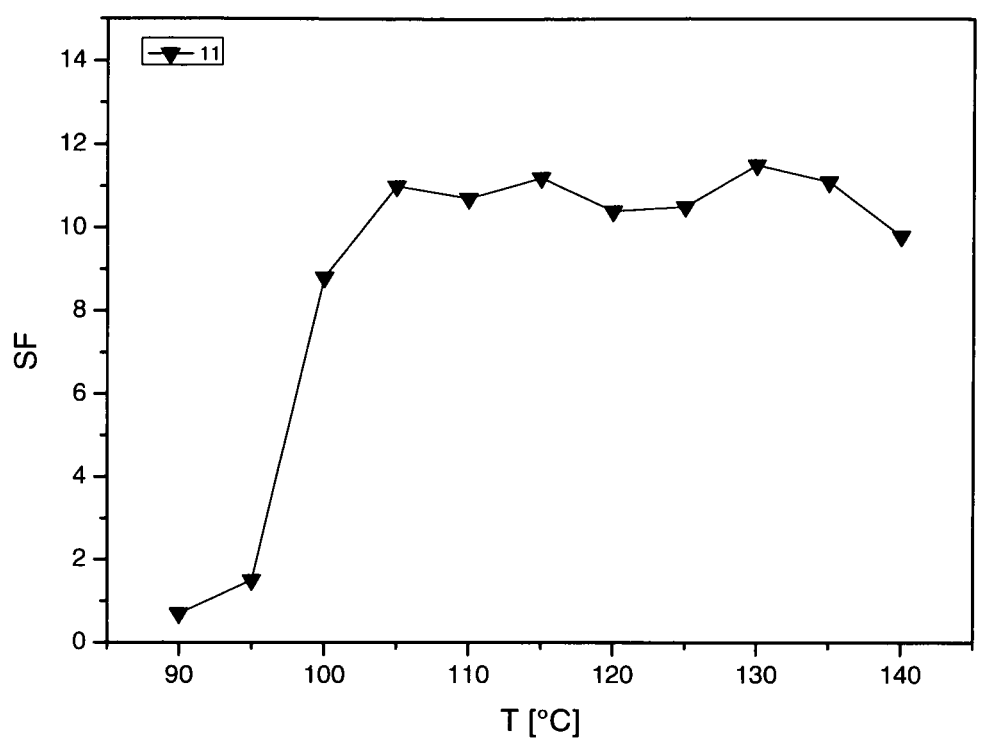
FIG. 8 (FIG. 8) shows the seal force SF (N/24 mm) of the LLDPE of example 11 as a function of the temperature T (° C.).

As can be seen by comparing FIG. 8 with FIG. 5-7, film of the invention shows a considerably higher average seal force (also referred to herein as seal strength) in the temperature range from 105 to 140° C. as compared to the films comprising the LLDPE of the comparative examples A-C.

Figure 9:
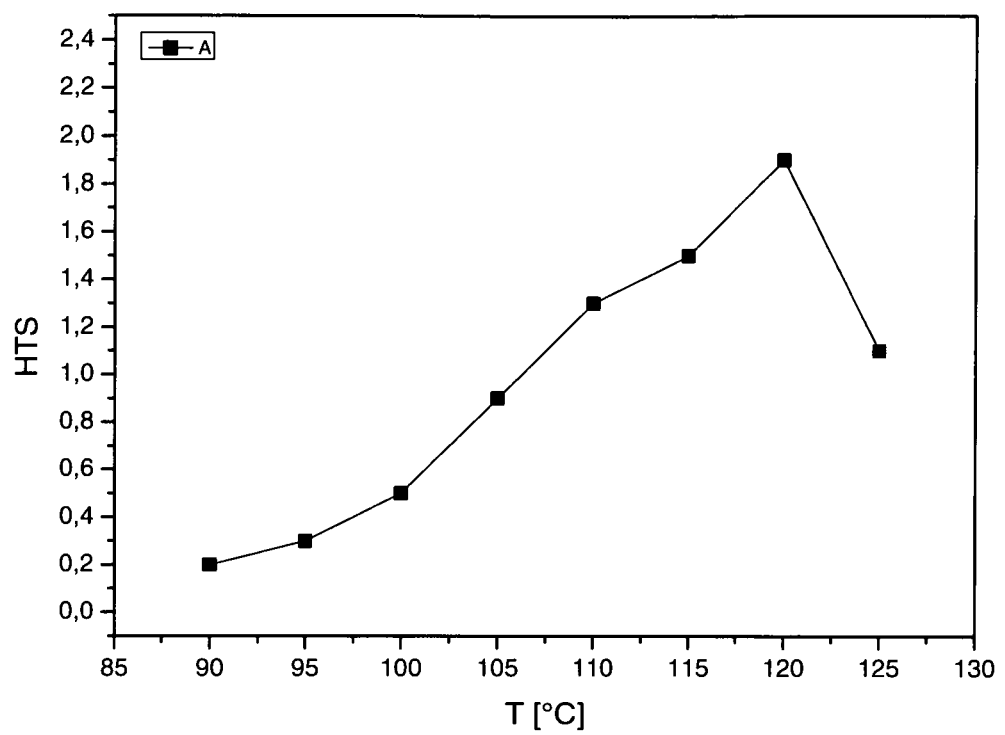
FIG. 9 (FIG. 9) shows the hot tack strength HTS (N/15 mm) of the LLDPE of comparative example A as a function of the temperature T (° C.).
Figure 10:
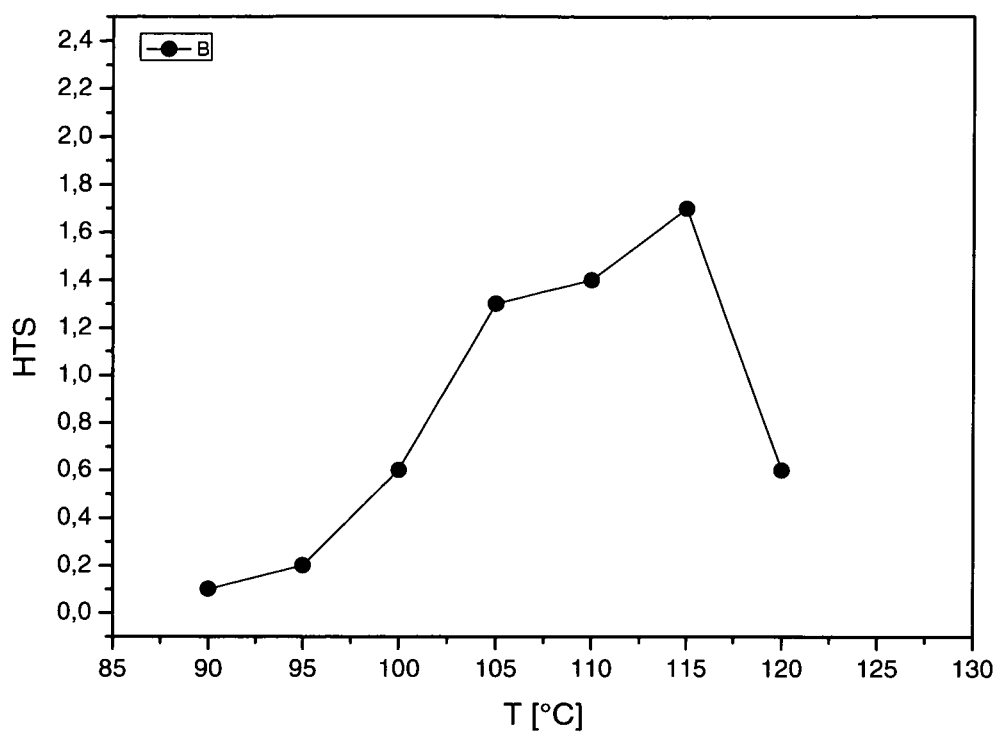
FIG. 10 (FIG. 10) shows the hot tack strength HTS (N/15 mm) of the LLDPE of comparative example B as a function of the temperature T (° C.).
Figure 11:
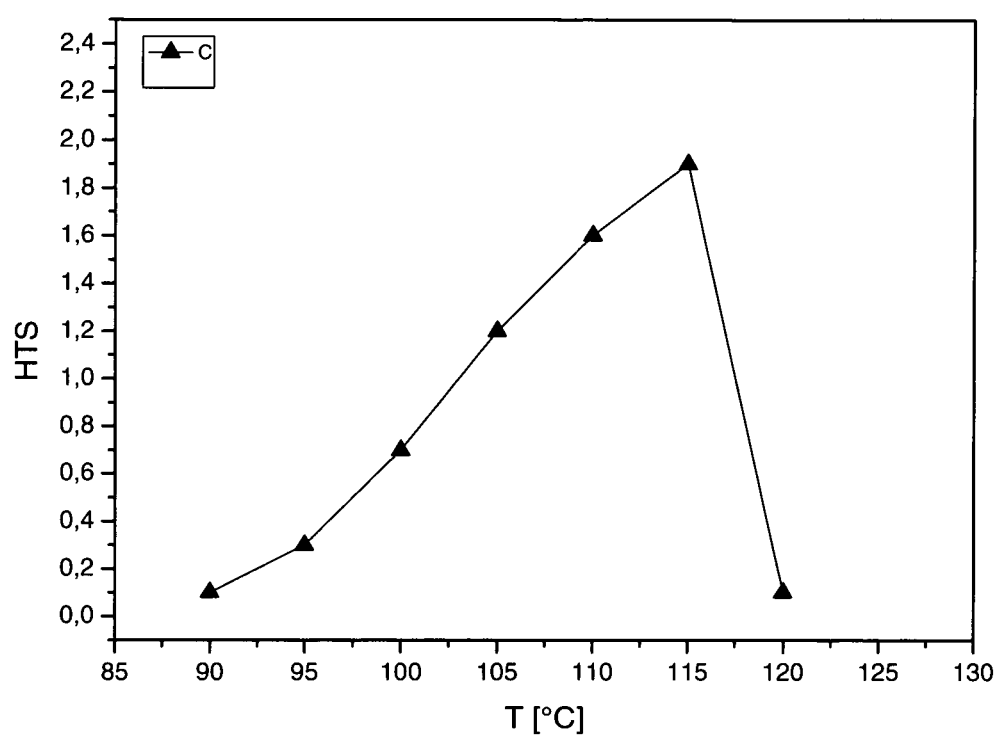
FIG. 11 (FIG. 11) shows the hot tack strength HTS (N/15 mm) of the LLDPE of comparative example C as a function of the temperature T (° C.).
Figure 12:
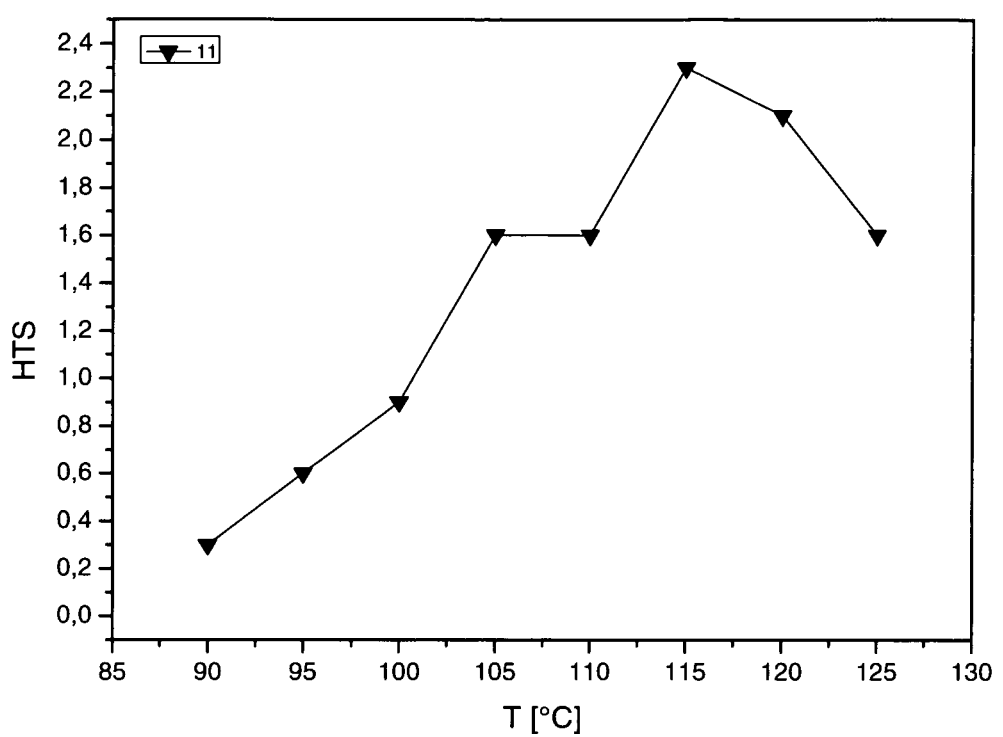
FIG. 12 (FIG. 12) shows the hot tack strength HTS (N/15 mm) of the LLDPE of example 11 as a function of the temperature T (° C.).

As can be seen by comparing FIG. 12 with FIG. 9-11, film of the invention shows a considerably higher average hot tack strength in the temperature range from 105 to 120° C. as compared to the films comprising the LLDPE of the comparative examples A-C.

The invention claimed is:

1. A catalyst composition for the polymerisation of olefins comprising
    a support;
    a single site catalyst component;
    a catalyst activator; and a modifier wherein the modifier is the product of reacting an aluminum compound of general formula (1)

(1)

with an amine compound of general formula (2)

(2)

wherein
R1 is hydrogen or a branched or straight, substituted or unsubstituted hydrocarbon group having 1-30 carbon atoms,
R2 and R3 are the same or different and selected from branched or straight, substituted or unsubstituted hydrocarbon groups having 1-30 carbon atoms,
R4 is hydrogen or a functional group with at least one active hydrogen,
R5 is hydrogen or a branched, straight or cyclic, substituted or unsubstituted hydrocarbon group having 1-30 carbon atoms,
R6 is a branched, straight or cyclic, substituted or unsubstituted hydrocarbon group having 1-30 carbon atoms,
wherein the single site catalyst component, the catalyst activator, and the modifier are all present on the support; and
wherein the aluminum content of the catalyst composition is in the range of 3-20 wt % based on the total weight of the catalyst composition.

2. The catalyst composition according to claim 1 wherein the amine compound is selected from octadecylamine, ethylhexylamine, cyclohexylamine, bis(4-aminocyclohexyl)methane, hexamethylenediamine, 1,3-benzenedimethanamine, 1-amino-3-aminomethyl-3,5,5-trimethylcyclohexane and 6-amino-1,3-dimethyluracil.

3. The catalyst composition according to claim 1, wherein the aluminum compound is a tri-alkylaluminum compound.

4. The catalyst composition according to claim 1, wherein the amounts of aluminum compound and amine compound are selected such that in the modifier a molar ratio of Al to N is in the range of 1:3 to 5:1.

5. The catalyst composition according to claim 1, wherein the catalyst activator is an alumoxane, a perfluorophenylborane, a perfluorophenylborate or a mixture of at least two of such catalyst activators.

6. The catalyst composition according to claim 1, wherein the composition further comprises a Ziegler-Natta and/or a chromium based catalyst component.

7. The catalyst composition according to claim 1, wherein the aluminum content of the catalyst composition is in the range of 7-12 wt %, based on the total weight of the catalyst composition.

8. The catalyst composition according to claim 1, wherein the single site catalyst component is a metallocene catalyst.

9. The catalyst composition according to claim 8 wherein the metallocene catalyst contains zirconium and wherein the zirconium content of the catalyst composition is in the range of 0.02-1 wt % based on the catalyst composition.

10. A method for preparing the catalyst composition according to claim 1 comprising:
a) preparing a modifier by reacting an aluminum compound of general formula (1)

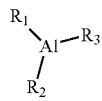

(1)

with an amine compound of general formula (2)

(2):

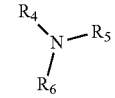

b) activating a single site catalyst component by adding a catalyst activator to said single site catalyst component to obtain an activated single site catalyst component;
c) combining in a solvent a support material, the activated single site catalyst component obtained in step b) and the modifier obtained in step a);
d) optionally drying the reaction product obtained in step c);
wherein
R1 is hydrogen or a branched or straight, substituted or unsubstituted hydrocarbon group having 1-30 carbon atoms,
R2 and R3 are the same or different and selected from branched or straight, substituted or unsubstituted hydrocarbon groups having 1-30 carbon atoms,
R4 is hydrogen or a functional group with at least one active hydrogen,
R5 is hydrogen or a branched, straight or cyclic, substituted or unsubstituted hydrocarbon group having 1-30 carbon atoms, and
R6 is a branched, straight or cyclic, substituted or unsubstituted hydrocarbon group having 1-30 carbon atoms.

11. The method according to claim 10 wherein step a) is carried out at a temperature of 0° C.-50° C.

12. A method for the polymerisation of olefins comprising contacting olefins with the catalyst composition according to claim 1 in a reactor.

13. A method according to claim 12 comprising
i) adding ethylene and optionally one or more alpha-olefins having 3 to 10 carbon atoms to the reactor; and
ii) adding the catalyst composition to the reactor to produce a polyethylene.

14. The method for polymerisation of olefins according to claim 12 wherein during the polymerisation a continuity aid agent is added to the reactor wherein said continuity aid agent is prepared separately prior to introduction into the reactor by reacting:
at least one metal alkyl or metal alkyl hydride compound of a metal from group IIA or IIIA of the periodic system of elements, and
at least one compound of general formula $R_mXR'_n$, wherein
R is a branched, straight, or cyclic, substituted or unsubstituted hydrocarbon group having 1 to 50,
R' is hydrogen or a functional group with at least one active hydrogen,
X is a heteroatom selected from the group of O, N, P or S,
n and m are each at least 1 and are such that the formula has no net charge, and
the molar ratio of the metal of the metal alkyl compound and X is about 2:1 about 10:1.

15. The method for polymerisation of olefins according to claim 14, wherein the continuity aid agent is the product of reacting an aluminum compound of general formula

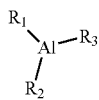

with an amine compound of general formula

wherein
R1 is hydrogen or a branched or straight, substituted or unsubstituted hydrocarbon group having 1-30 carbon atoms,
R2 and R3 are the same or different and selected from branched or straight, substituted or unsubstituted hydrocarbon groups having 1-30 carbon atoms,
R4 is hydrogen or a functional group with at least one active hydrogen,
R5 is hydrogen or a branched or straight, substituted or unsubstituted hydrocarbon group having 1-30 carbon atoms,
R6 is a branched or straight, substituted or unsubstituted hydrocarbon group having 1-30 carbon atoms.

16. A method of reducing reactor fouling, reactor sheeting, or a combination thereof during polymerization of olefins, the method comprising:
polymerizing olefins in the presence of a catalyst composition;
wherein the catalyst composition comprises a support, a single site catalyst component, a catalyst activator, and a modifier;
wherein the modifier comprises a reaction product obtained by reacting an aluminum compound of general formula

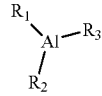

with an amine compound of general formula

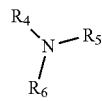

wherein
R1 is hydrogen or a branched or straight, substituted or unsubstituted hydrocarbon group having 1-30 carbon atoms,
R2 and R3 are the same or different and selected from branched or straight, substituted or unsubstituted hydrocarbon groups having 1-30 carbon atoms,
R4 is hydrogen or a functional group with at least one active hydrogen
R5 is hydrogen or a branched or straight, substituted or unsubstituted hydrocarbon group having 1-30 carbon atoms, and
R6 is a branched or straight, substituted or unsubstituted hydrocarbon group having 1-30 carbon atoms;
wherein the single catalyst component, the catalyst activator, and the modifier are all present on the support; and
wherein the aluminum content of the catalyst composition is in the range of 3-20 wt % based on the total weight of the composition.

17. The catalyst composition of claim 1, wherein the composition is a powder comprising particles having a size of 1 to 300 microns.

18. The method of claim 13, wherein the polyethylene is a linear low density polyethylene.

* * * * *